US010637745B2

(12) United States Patent
Naous

(10) Patent No.: US 10,637,745 B2
(45) Date of Patent: Apr. 28, 2020

(54) ALGORITHMS FOR ROOT CAUSE ANALYSIS

(71) Applicant: AppDynamics LLC, San Francisco, CA (US)

(72) Inventor: Jad Naous, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 496 days.

(21) Appl. No.: 15/224,402

(22) Filed: Jul. 29, 2016

(65) Prior Publication Data

US 2018/0034685 A1 Feb. 1, 2018

(51) Int. Cl.
*H04L 12/24* (2006.01)
*H04L 12/26* (2006.01)

(52) U.S. Cl.
CPC .......... *H04L 41/22* (2013.01); *H04L 41/064* (2013.01); *H04L 43/028* (2013.01); *H04L 43/08* (2013.01)

(58) Field of Classification Search
CPC ..... H04L 41/22; H04L 41/064; H04L 43/028; H04L 43/08
USPC ........................................................ 709/224
See application file for complete search history.

(56) References Cited

U.S. PATENT DOCUMENTS

| 6,643,613 | B2 * | 11/2003 | McGee ............... G06F 11/0709 700/51 |
| 7,437,450 | B1 * | 10/2008 | Gore ................... H04L 41/5009 702/186 |
| 8,738,972 | B1 * | 5/2014 | Bakman .............. G06F 11/0712 714/47.1 |
| 2005/0219151 | A1 * | 10/2005 | Li .......................... H04L 41/22 345/7 |
| 2008/0016412 | A1 * | 1/2008 | White ................. G06F 11/3409 714/48 |
| 2010/0050023 | A1 * | 2/2010 | Scarpelli ............. G06F 11/0709 714/46 |
| 2010/0325493 | A1 * | 12/2010 | Morimura ........... G06F 11/0709 714/39 |
| 2011/0276836 | A1 * | 11/2011 | Kahana ............... G06F 11/0709 714/38.1 |
| 2012/0054331 | A1 * | 3/2012 | Dagan ................. G06F 11/0712 709/224 |

(Continued)

*Primary Examiner* — Nicholas R Taylor
*Assistant Examiner* — Chong G Kim
(74) *Attorney, Agent, or Firm* — Behmke Innovation Group LLC; James M. Behmke; James J. Wong

(57) ABSTRACT

In one aspect, a system for identifying a root cause of a performance issue in a monitored entity is disclosed. The system can detect a performance issue with the monitored entity running in a monitored environment of networked entities; receive a plurality of datatypes and associated data for each entity, the plurality of datatypes include metrics, events, logs, snapshots, and configurations; provide a dashboard user interface to display the datatypes and associated data for each entity as user selectable items; receive user input through the dashboard user interface that indicate a selection of two of the datatypes for performing correlation analysis; perform the correlation analysis using the received user selection of the two of the datatypes; identify a candidate root cause of the performance issue based on the correlation analysis; and display the identified candidate root cause through the dashboard user interface.

21 Claims, 28 Drawing Sheets

(56) References Cited

U.S. PATENT DOCUMENTS

| | | | |
|---|---|---|---|
| 2014/0267788 A1* | 9/2014 | Bowler | H04N 17/00 |
| | | | 348/192 |
| 2016/0057034 A1* | 2/2016 | Rosier | H04L 41/0883 |
| | | | 709/224 |
| 2016/0147622 A1* | 5/2016 | Nichols | G06F 16/178 |
| | | | 714/57 |
| 2016/0352589 A1* | 12/2016 | Zhu | H04L 43/04 |
| 2017/0331673 A1* | 11/2017 | Iyer | H04L 41/16 |

* cited by examiner

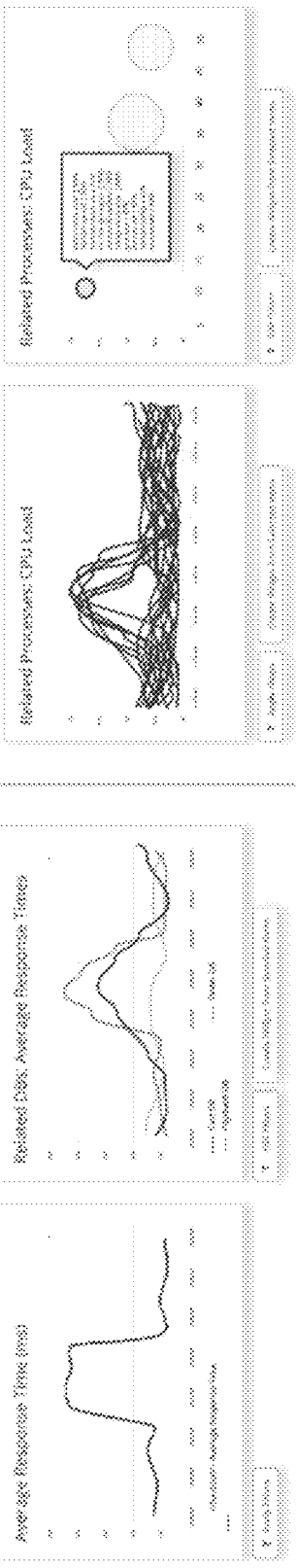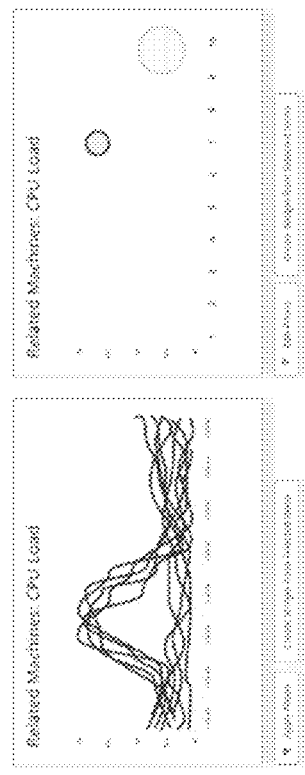
FIG. 3B

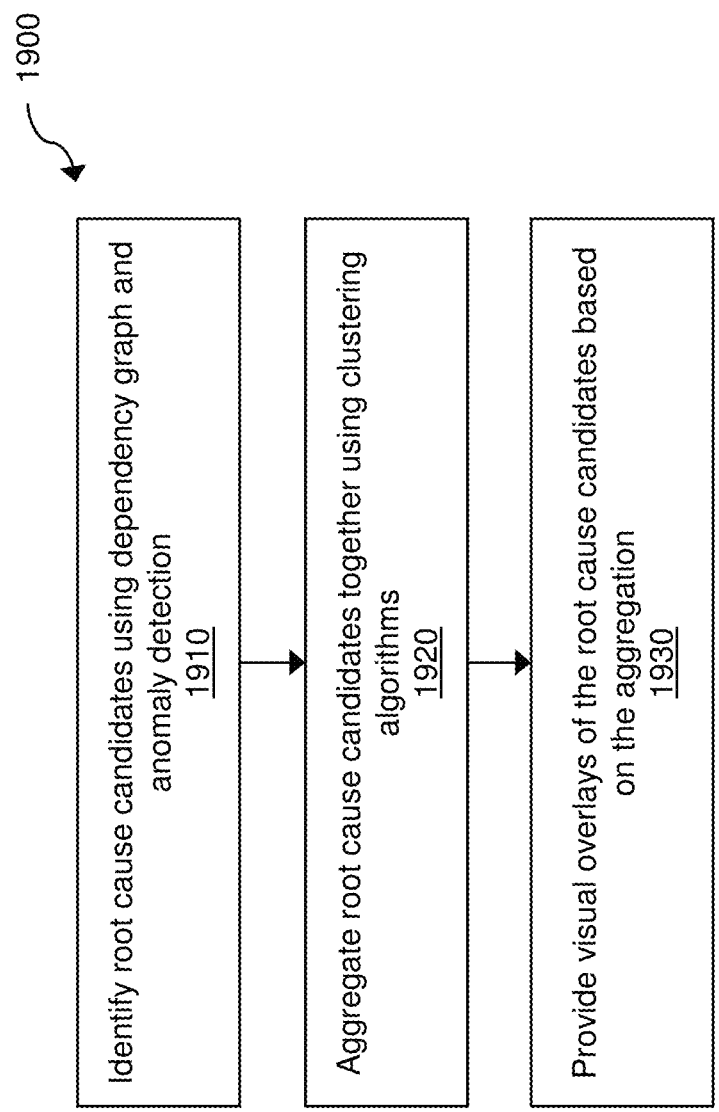

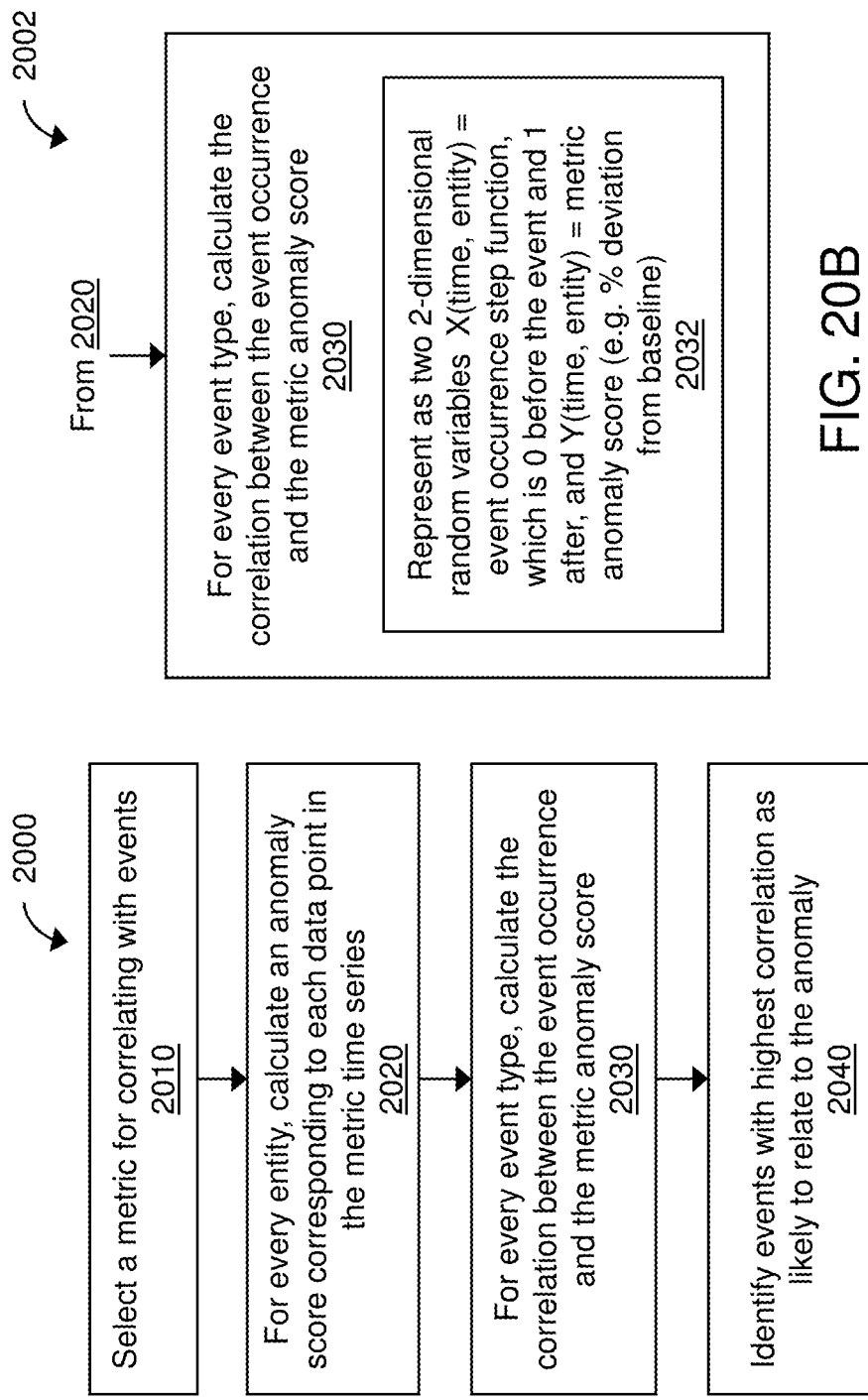

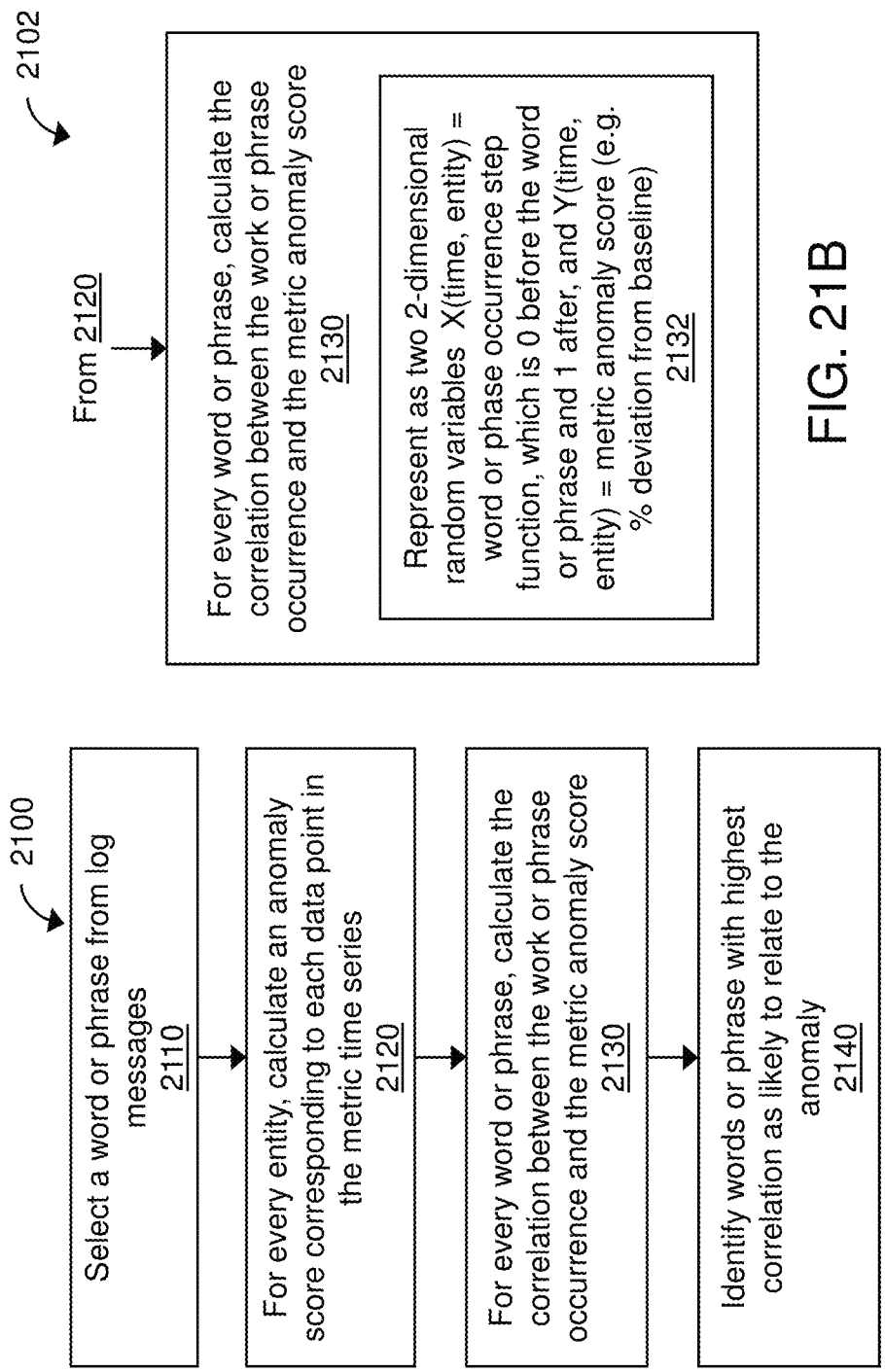

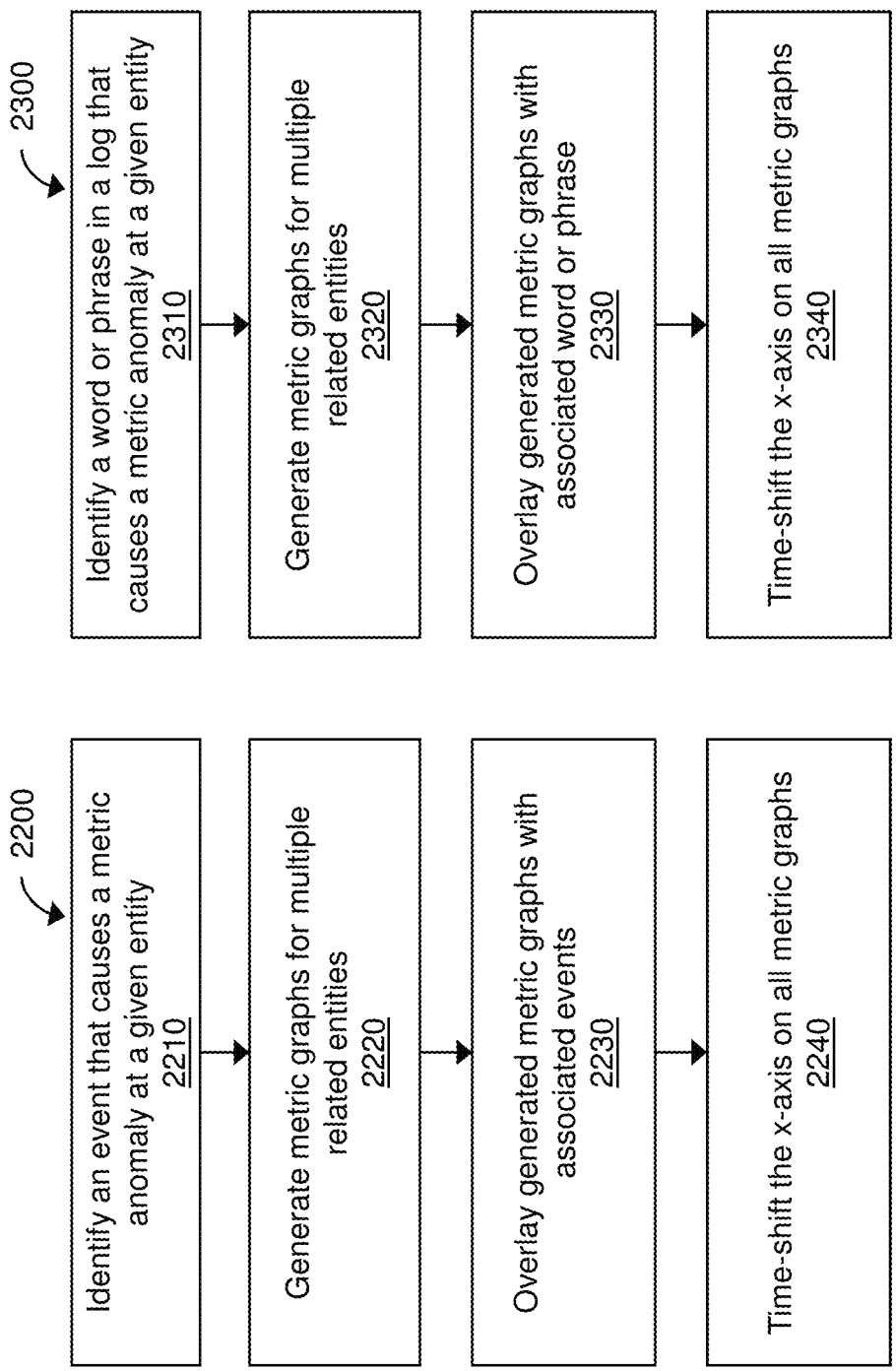

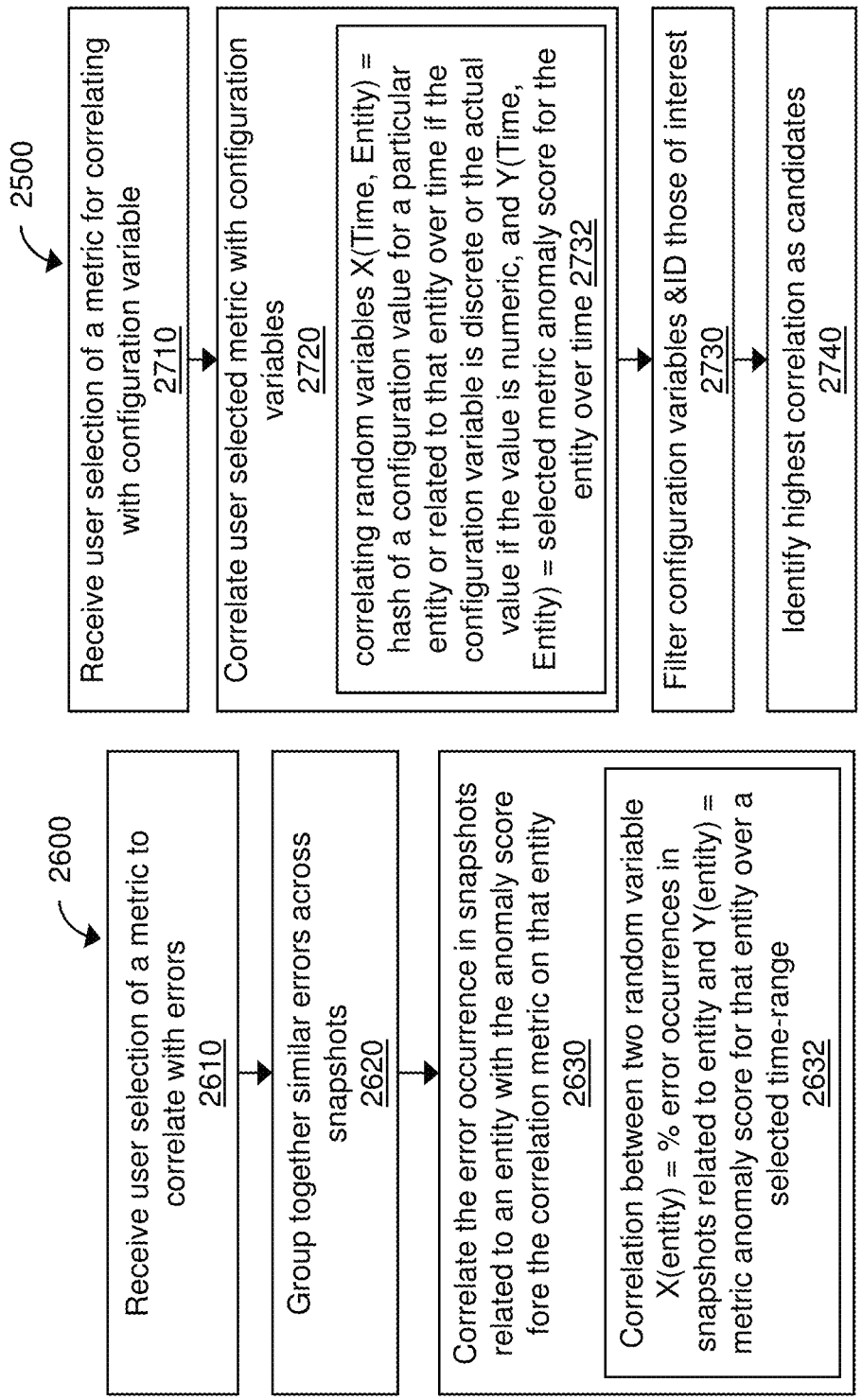

ALGORITHMS FOR ROOT CAUSE ANALYSIS

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of algorithms for performing guided exploration and automated root cause analysis are disclosed.

In one aspect, a system for identifying a root cause of a performance issue in a monitored entity is disclosed. The system includes a processor; a memory; and one or more modules stored in the memory and executable by a processor to perform operations including: detect a performance issue with the monitored entity running in a monitored environment of networked entities; receive a plurality of datatypes and associated data for each entity, the plurality of datatypes include metrics, events, logs, snapshots, and configurations; provide a dashboard user interface to display the datatypes and associated data for each entity as user selectable items; receive user input through the dashboard user interface that indicate a selection of two of the datatypes for performing correlation analysis; perform the correlation analysis using the received user selection of the two of the datatypes; identify a candidate root cause of the performance issue based on the correlation analysis; and display the identified candidate root cause through the dashboard user interface.

The system can be implemented in various ways to include one or more of the following features. For example, the user input indicative of the selection of the two of the datatypes can include a selection of events and metrics; and the selection of metrics can include a selection one of a plurality of metrics time-series for each entity. The one or more modules can be executable by a processor to perform operations including: assign an anomaly score for each data point in the selected one of the plurality of metrics time-series for each entity; determine a correlation between the assigned anomaly score and the events to perform the correlation; and identify one or more of the events as the candidate root cause based on the correlation between the assigned anomaly score and the events. The user input indicative of the selection of the two of the datatypes can include a selection of logs and metrics; and the selection of metrics can include a selection one of a plurality of metrics time-series for each entity. The one or more modules can be executable by a processor to perform operations including: assign an anomaly score for each data point in the selected one of the plurality of metrics time-series for each entity; determine a correlation between the assigned anomaly score and words or phrases in the logs to perform the correlation; and identify one or more of the words or phrases in the logs as the candidate root cause based on the correlation between the assigned anomaly score and the words or phrases in the logs. The user input indicative of the selection of the two of the datatypes can include a selection of configurations and metrics; and the selection of metrics can include a selection one of a plurality of metrics time-series for each entity. The one or more modules can be executable by a processor to perform operations including: assign an anomaly score for each data point in the selected one of the plurality of metrics time-series for each entity; determine a correlation between the assigned anomaly score and the configurations to perform the correlation; and identify one or more of the configurations as the candidate root cause based on the correlation between the assigned anomaly score and the configurations.

In another aspect, a method for identifying a root cause of a performance issue in a monitored entity is disclosed. The method includes detecting a performance issue with the entity running in a monitored environment of networked entities; receiving a plurality of datatypes and associated data for each entity, the plurality of datatypes include metrics, events, logs, snapshots, and configurations; providing a dashboard user interface to display the datatypes and associated data for each entity as user selectable items; receiving user input through the dashboard user interface that indicate a selection of two of the datatypes for performing correlation analysis; performing the correlation analysis using the received user selection of the two of the datatypes; identifying a candidate root cause of the performance issue based on the correlation analysis; and display the identified candidate root cause through the dashboard user interface.

The method can be implemented in various ways to include one or more of the following features. For example, the user input indicative of the selection of the two of the datatypes can include a selection of events and metrics; and the selection of metrics can include a selection one of a plurality of metrics time-series for each entity. The method can include assigning an anomaly score for each data point in the selected one of the plurality of metrics time-series for each entity; determining a correlation between the assigned anomaly score and the events to perform the correlation; and identifying one or more of the events as the candidate root cause based on the correlation between the assigned anomaly score and the events. The user input indicative of the selection of the two of the datatypes can include a selection of logs and metrics; and the selection of metrics can include a selection one of a plurality of metrics time-series for each entity. The method can include: assigning an anomaly score for each data point in the selected one of the plurality of metrics time-series for each entity; determining a correlation between the assigned anomaly score and words or phrases in the logs to perform the correlation; and identifying one or more of the words or phrases in the logs as the candidate root cause based on the correlation between the assigned anomaly score and the words or phrases in the logs. The user input indicative of the selection of the two of the datatypes can include a selection of configurations and metrics; and the selection of metrics can include a selection one of a plurality of metrics time-series for each entity. The method can include: assigning an anomaly score for each data point in the selected one of the plurality of metrics time-series for each entity; determining a correlation between the assigned anomaly score and the configurations to perform the correlation; and identifying one or more of the configurations as the candidate root cause based on the correlation between the assigned anomaly score and the configurations.

In yet another aspect, a non-transitory computer readable medium embodying instructions when executed by a processor to cause operations to be performed for identifying a root cause of a performance issue in a monitored entity is disclosed. The operations include detecting a performance issue with the monitored entity running in a monitored environment of networked entities; receiving a plurality of datatypes and associated data for each entity, the plurality of datatypes include metrics, events, logs, snapshots, and configurations; providing a dashboard user interface to display the datatypes and associated data for each entity as user selectable items; receiving user input through the dashboard user interface that indicate a selection of two of the datatypes for performing correlation analysis; performing the correlation analysis using the received user selection of the two of the datatypes; identifying a candidate root cause of the performance issue based on the correlation analysis; and display the identified candidate root cause through the dashboard user interface.

The non-transitory computer readable medium can be implemented in various ways to include one or more of the following features. For example, the user input indicative of the selection of the two of the datatypes can include a selection of events and metrics; and the selection of metrics can include a selection one of a plurality of metrics time-series for each entity. The operations can include assigning an anomaly score for each data point in the selected one of the plurality of metrics time-series for each entity; determining a correlation between the assigned anomaly score and the events to perform the correlation; and identifying one or more of the events as the candidate root cause based on the correlation between the assigned anomaly score and the events. The user input indicative of the selection of the two of the datatypes can include a selection of logs and metrics; and the selection of metrics can include a selection one of a plurality of metrics time-series for each entity. The operations can include: assigning an anomaly score for each data point in the selected one of the plurality of metrics time-series for each entity; determining a correlation between the assigned anomaly score and words or phrases in the logs to perform the correlation; and identifying one or more of the words or phrases in the logs as the candidate root cause based on the correlation between the assigned anomaly score and the words or phrases in the logs. The user input indicative of the selection of the two of the datatypes can include a selection of configurations and metrics; and the selection of metrics can include a selection one of a plurality of metrics time-series for each entity. The operations can include: assigning an anomaly score for each data point in the selected one of the plurality of metrics time-series for each entity; determining a correlation between the assigned anomaly score and the configurations to perform the correlation; and identifying one or more of the configurations as the candidate root cause based on the correlation between the assigned anomaly score and the configurations.

The disclosed systems, methods and non-transitory computer readable medium embodying instructions when executed by a processor to cause operations to be performed can be combined with the disclosed guided exploration and automated root cause analysis individually or in combination.

BRIEF DESCRIPTION OF THE DRAWINGS

FIGS. 3A and 3B are diagram showing an exemplary user interface for displaying a list of related entities, the associated datatype, and data for user selection.

FIG. 19 is a process flow diagram of an exemplary process flow for identifying root cause candidates and clustering the candidates.

FIGS. 20A and 20B are process flow diagrams of processes for finding events in a system that may be the cause of metric anomalies.

FIGS. 21A and 21B are process flow diagrams of processes for performing logs based analysis to identify any words or phrases in the log messages that correlate with metric anomalies.

FIG. 22 is a process flow diagram showing an exemplary process for generating time-shifted event graphs to help users understand the impact of an event on matric behavior.

FIG. 23 is a process flow diagrams showing an exemplary process for generating time-shifted log graphs to help users understand the impact of a log message on matric behavior.

FIG. 26 is a process flow diagram of an exemplary process for identifying errors that are related to real performance issues.

FIG. 27 is a process flow diagram of an exemplary process for identifying certain configuration values that lead to issues in performance.

DETAILED DESCRIPTION

Figure 1A:
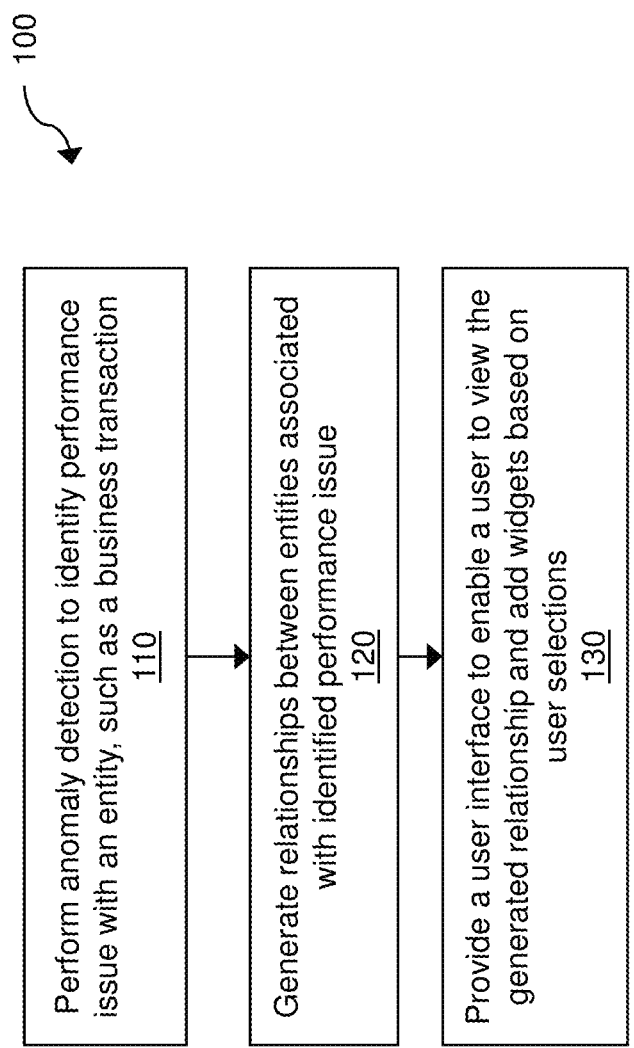
FIG. 1A is a process flow diagram of an exemplary process for providing guided exploration as disclosed.

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and user experience, each web application can be monitored to provide insight into information that can negatively affect the overall performance of the web application. For example, information including bottle necks in communication, communication failures and other information regarding performance of the services that provide the web application can be detected. A given event on a given server or tier of application nodes may often affect a remote application, and identifying the root cause of a performance issue with monitored entity, such as a business transaction, can be daunting due to the myriad of choices and paths to diagnose the performance issue. Manually reviewing and processing the performance data of each and every application on multiple servers to detect the event causing a problem is extremely time consuming exercise that may never lead to an adequate solution to the performance degradation problem. In general, the various paths are left to the user to explore without any guidance and the various data to analyze is left to the user to choose. This leads to long mean time to repair as the user in many instances is left to stumble around looking for the right set of data to review in hopes of identifying the root cause of the performance issue.

Guided Exploration Overview

The technology disclosed in this patent document provides for dynamic and efficient application intelligence platforms, systems, devices, methods, and computer readable media including non-transitory type that embody instructions for causing a machine including a processor to perform various operations disclosed in this patent document to diagnose and identify the root cause of a performance issue in a monitored environment using guided exploration. The guided exploration as disclosed in this patent document can be applied to any entity whether the entity is related to a business transaction or otherwise. Specifically, the disclosed technology provides for a model of the relationships between various entities in the monitored environment. For example, a machine is related to a node running on that machine, and a tier includes multiple nodes. The model that indicates the relationships between various entities can be visualized using appropriate data graphs, charts, tables, and graphical user interfaces to allow the user to visually navigate from reviewing performance data in the context of one entity to reviewing performance data of a related entity. Using the visualization of the model, the user can visually navigate the entire data set related to a particular performance issue and understand how the data set relates to the performance issue in order to identify the root cause of the performance issue.

Guided Exploration Process

FIG. 1A is a process flow diagram of an exemplary process 100 for providing guided exploration as disclosed. Troubleshooting a potential performance issue with a monitored environment begins with anomaly detection to inform the user about the potential performance issue (110). The disclosed technology provides for a guided exploration of the monitored environment to provide the user with a deeper access to the underlying data and ultimately identify and address the root cause of the potential performance issue.

Guided exploration can help a user to identify the root cause of the detected performance issue by generating relationship data indicative of a chain of relationships among different entities associated with the detected anomaly or performance issue (120). A user interface is provided on a dashboard to enable the user to view the generated relationships and add widgets to the dashboard based on user selections (130).

Figure 1B:
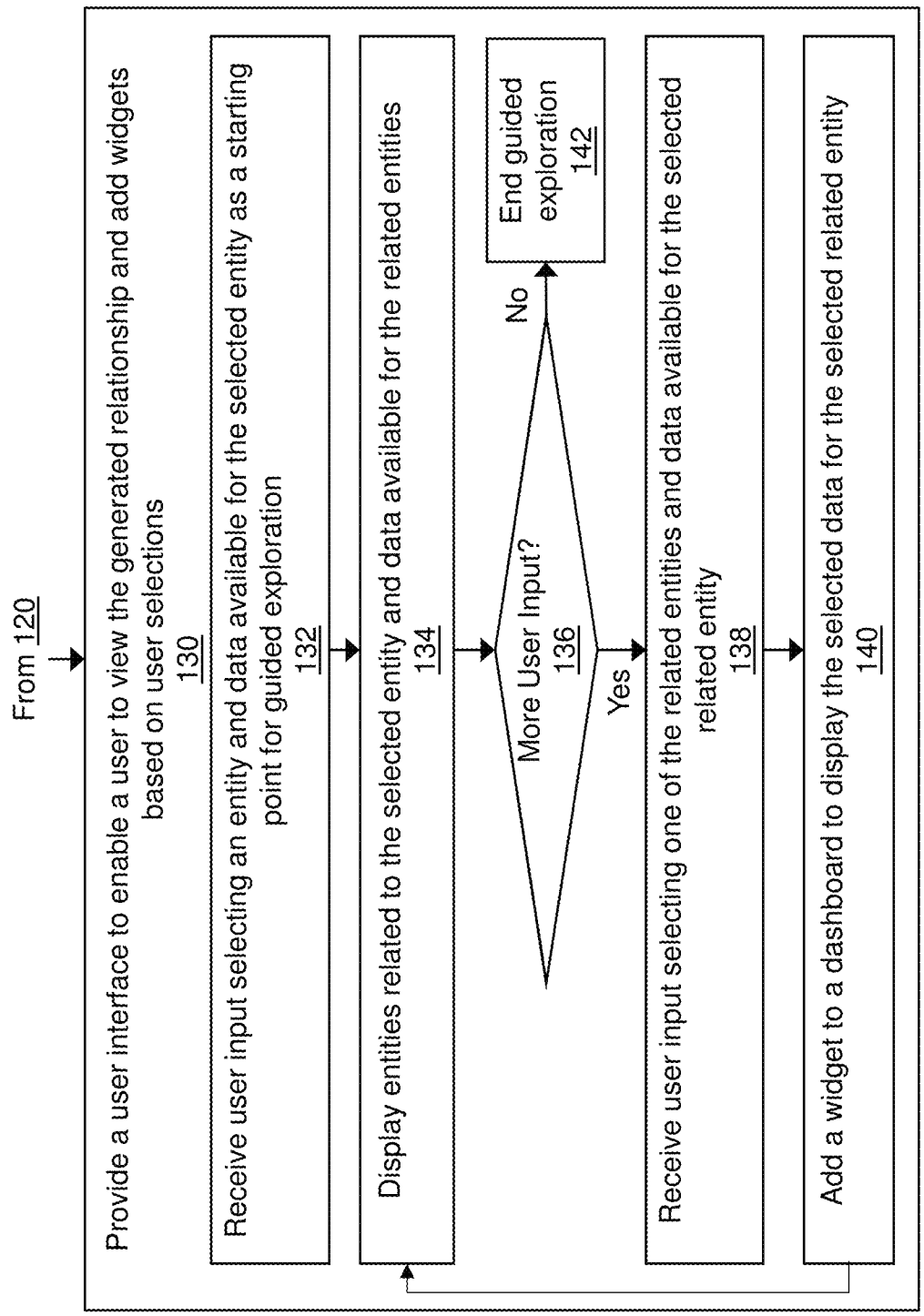
FIG. 1B is a process flow diagram showing an exemplary process for enabling the user to perform the guided exploration.

FIG. 1B is a process flow diagram showing an exemplary process for enabling the user to perform the guided exploration. Specifically, FIG. 1B shows an exemplary process (130) for providing the user interface on a dashboard to enable the user to view the generated relationships and add widgets to the dashboard based on user selections. The guided exploration begins from a particular starting point in the chain of relationships in the monitored environment where the performance issue has been identified. User input selecting an entity and data available for the selected entity is received as a starting point for the guided exploration (132). For example, user input selecting a particular entity, such as a business transaction and the average response time for the particular entity, such as a business transaction may be received. Responsive to the received user input, entities related to the selected entity and data available for the related entities are displayed on the dashboard (134). The user can select any of the related entities and receive analysis of the available data for the related entities. When determined that user desired to drill down further into the related entities (136, Yes), user input selecting one of the related entities and the available data for the selected related entity is received (138). Responsive to the user selection of the related entity and the available data for the selected related entity, a widget is automatically added to the dashboard to display the selected data for the selected related entity (140). The process then loops back to displaying the related entities for the previously selected entity (134) and the processes (136), (138), and (140) repeats as long as the user continues to drill down to select a related entity. In this manner, the user can perform a guided exploration up and down the chain of relationships based on the user selection. When the user stops drilling down into the related entities (136, No), the guided exploration ends (142).

The widgets added during the guided exploration can display relevant user selected metrics for the user selected entities. The visualized relationships among different entities associated with the detected anomaly or performance issue can enable the user to easily navigate from viewing metric data of one entity or object to viewing metric data of a related entity object. For example, the user can view an application running on a machine to review metric data on the performance of the application and the performance of the machine running the application. When the application running on multiple machines, the user can select a different machine. Thus, the user can navigate to any of the machines, or any nodes in a tier, and any of the tiers associated with a business transaction.

Each entity associated with a performance issue has a set of data sources related to the entity. For example, a business transaction entity can have a set of data sources associated with the business transaction, including metadata identifying the types of metrics to be monitored, metrics data that includes the actual monitored data for the metrics, logs of the monitored data, snapshots of the monitored data, etc. The disclosed guided exploration enables the user to easily and intuitively navigate the relationships between entities, review and compare different data sources, and receive analysis of different data sources. The disclosed guided exploration provides the user with insights into the root cause of the performance issue from the analysis of the data sources. In addition, the disclosed guided exploration allows the user to filter the related entity and data source selections for anomalies and for correlations with the symptoms of the performance issue.

Exemplary Implementations

In various examples of implementations of the disclosed guided exploration, an anomaly detection can identify a business transaction that is slower than a predetermined threshold. The identified slower than threshold business transaction can be provided to a user through an alert, based on a health rule for example. The user can review the identified business transaction and begin a guided exploration to identify the root cause of the slower than threshold business transaction. The related entities for the slower than threshold business transaction are identified including the relationships between the entities. For example, the related entities for the business transaction can include tiers of nodes of servers and machines that the business transaction is running on; databases that the business transaction is contacting, reading, and writing to; related backends; the servers or machines that are actually running the business transaction; and pages that may be accessing the business transaction.

The user may start the guided exploration by reviewing the tier metrics for the business transaction. Through the information presented during the guided exploration, the user can easily identify the relationships that the tiers actually have with other entities. For example, the tiers may be running other business transactions. The tiers associated with a given business transaction may be related to other entities, such as machines, databases, etc. that may affect the performance of different business transactions.

In another exemplary implementation, unbeknownst to the user, a DNS misconfiguration on a number of machines in a monitored environment may be the root cause of a particular performance issue. The DNS misconfiguration can cause a given server to no longer be able to execute outgoing calls. The inability to execute outgoing calls can lead to errors for a business transaction performed by the server to increase significantly for that server.

The user can use the disclosed guided exploration to start troubleshooting the performance issue by reviewing the overall error metrics of the affected business transaction. The guided exploration can visualize for the user the business transaction error metrics on the individual servers. A model behind the guided exploration can filter the overall error metrics for the business transaction to isolate "interesting data" for the user. Using the visualization, such as drop down menu selections, provided by the guided exploration, the user can select servers that are automatically highlighted as having the interesting data. The user is guided to view the filtered data for one such server, which may indicate that the machine-level network metrics are unusually low, indicating an anomaly. The user can then drill down to the networking-related configuration to determine whether there's something anomalous, and the guided exploration can be used to highlight a DNS configuration that does not match the working servers' DNS configuration to identify the root cause of the performance issue. Thus, the guided exploration graphically visualizes and navigates the relationships between entities to show how performance is impacted from one entity to another.

Dashboard Widgets

Figure 2:
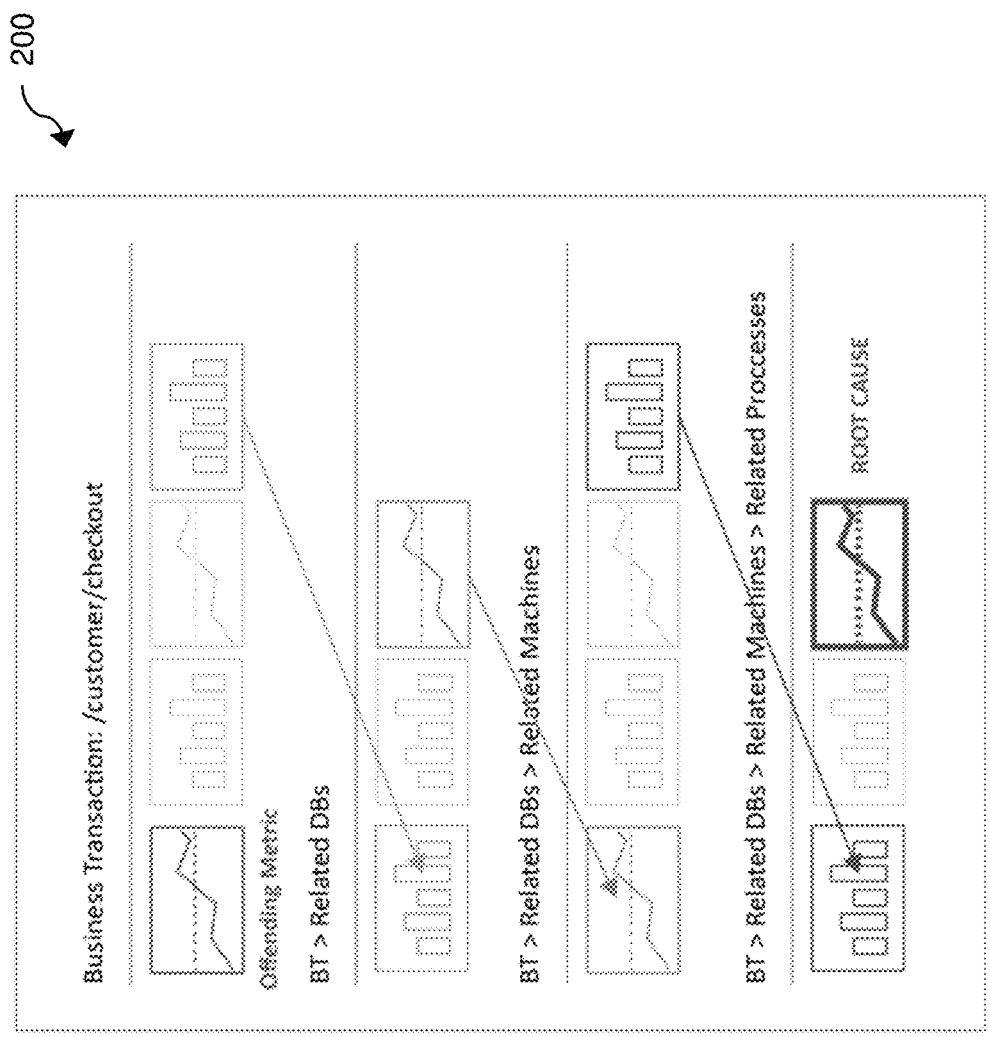
FIG. 2 is a diagram showing an exemplary process of performing guided exploration as disclosed to identify a root cause of a detected performance issue.

FIG. 2 is a diagram 200 showing an exemplary process of performing guided exploration as disclosed to identify a root cause of a detected performance issue. Performing the guided exploration results in building a dashboard of widgets to display the relevant data for related entities that provides clues to the root cause. Starting from an entity, such as a business transaction associated with the performance issue, guided exploration allows the user to drill down to review related entities associated with an identified performance issue and add data widgets of interest to display data, such as metrics data for the user selected entities. Each selection creates new available sections by drilling down into related data of interest. For example, the top row of data widgets (four of them in FIG. 2) represent different exemplary metric data for a particular business transaction (e.g., Business Transaction:/customer/checkout) that are showing anomalies. The user can review the different metrics showing performance issues and selection one of the metric data to review the analysis of that metrics data. This process continues the process until a root cause of the performance issue is found. In the example shown in FIG. 2, the user selected the fourth metric, the Average Response Time (ART) metric that is having a performance issue (i.e., slower than a threshold). Then the user is provided with a list (e.g., using a drop down menu) of related entities, such as the related databases (DBs). Then the user can select one of the related DBs and one of the available data for the selected DB as shown in the second row of FIG. 2. Then the user is provided with a list of entities related to the selected DB and the associated available data for the selected DB. For example, a list of related machines can be provided as shown in row 3 of FIG. 2. The user can select one of the related machines and data available for the selected machine. Then the user can select one of the related processes for the selected machine as shown in row 4 of FIG. 2 to identify that the root cause is the third process as shown in row 3 of FIG. 2.

Figure 3A:
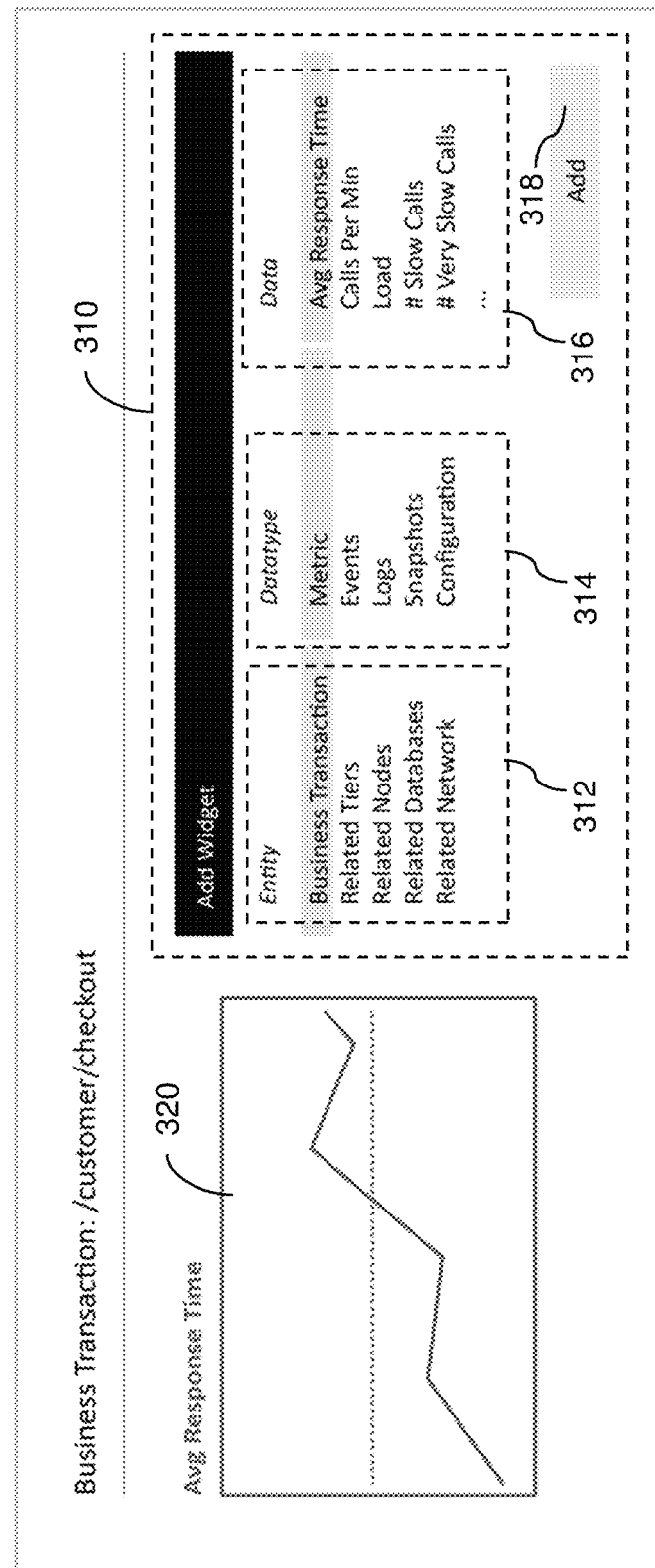

FIG. 3 is a diagram 300 showing an exemplary user interface for displaying a list of related entities, the associated datatype, and data for user selection. In the example shown in FIG. 3, the right panel 310 shows an exemplary user interface for adding a widget for a related entity, and the left panel 320 shows a graph of the data selected in the right panel 310. For the business transaction customer checkout, the right panel shows a list of entities related to the business transaction customer checkout. For example, the right panel 310 shows related entities 312 including business transaction, related tiers, related nodes, related databases, and related networks. For each related entity, different datatypes 314 available are shown, such as metric, events, logs, snapshots, and configuration. For each of these datatypes 314, the associated data 316 are shown, such as average response time, calls per minute, load, # slow calls, and # very slow calls. The user can add a widget for the selection of entity 312, datatype 314, and data 316 by pressing the add button 318, for example. In the example shown in FIG. 3, business transaction, metric, and average response time are selected by the user and a graphical representation of the average response time for the selected business transaction is shown in the left panel 320.

Thus, the user can filter (by making a selection) for the business transaction having performance issues and drill down into the selected business transaction. That selection of the business transaction entity adds a new section in the dashboard as a widget. Using the guided exploration, the user can drill down from the business transaction to the related DBs, then to the related machines, and then to the related processes until the root cause is identified. The drilling down process using the guided exploration adds metrics and widgets related to those entities, such as related DBs, machines, processes, etc. For example, widgets and metrics for the business transaction having performance issues can be added and then the user can drill down to the DBs that may affect the business transaction, then to the machines that may affect the DBs (e.g., issues with CPUs), and then the processes that may affect the machines. For example, after drilling down into the processes, the user may notice that there are some processes that show up around midnight when the performance issue with the business transaction occurs. Then the user can review the metrics for those processes to determine whether the processes are the root cause of the performance issues detected for the business transaction. FIG. 3B shows this process.

Each time the user drills down into a related entity, the user is setting a new context to display on the dashboard. In this manner, each time the user drills down into a related entity, the user is switching context from one entity to a related entity. In other words, the drill down is to the entities that are represented on the filtered and customized graph in a particular context. Thus, these are related entities and also a subset of all the related entities. The entities of interest to the user (for example, drill down to the machines with the highest CPU load) are presented in the drill down.

Figure 4:
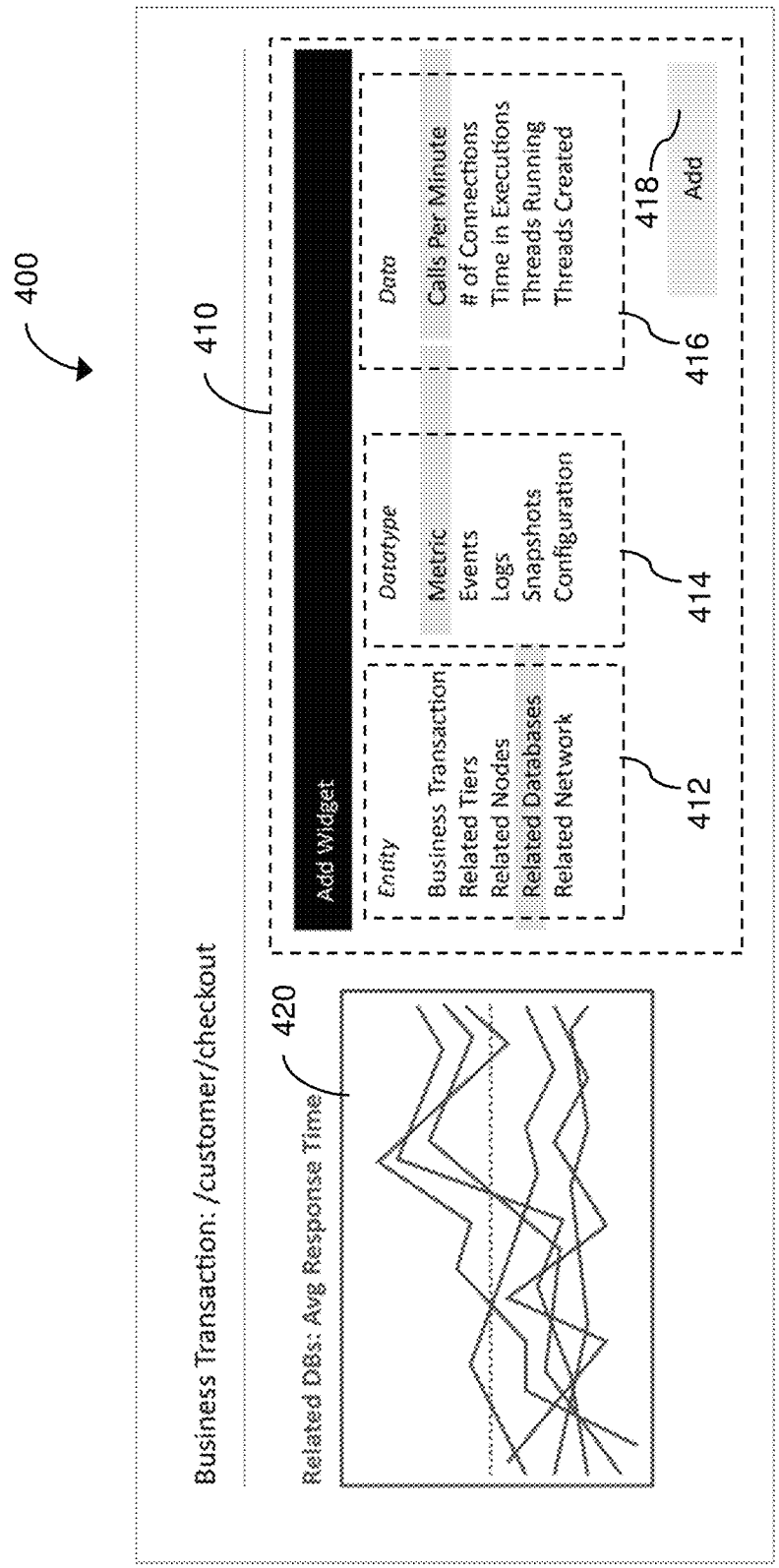
FIG. 4 is a diagram showing another exemplary user interface for displaying a list of related entities, the associated datatype, and data for user selection.

FIG. 4 is a diagram 400 showing another exemplary user interface for displaying a list of related entities, the associated datatype, and data for user selection. In the example shown in FIG. 4, the right panel 410 shows an exemplary user interface for adding a widget for a related entity, and the left panel 420 shows a graph of the data selected in the right panel 410. For the business transaction customer checkout, the right panel shows a list of entities related to the business transaction customer checkout. For example, the right panel 410 shows related entities 412 including business transaction, related tiers, related nodes, related databases, and related networks. For each related entity, different datatypes 414 available are shown, such as metric, events, logs, snapshots, and configuration. For each of these datatypes 414, the associated data 416 are shown, such as average response time, calls per minute, load, # slow calls, and # very slow calls. The user can add a widget for the selection of entity 412, datatype 414, and data 416 by pressing the add button 418, for example. In the example shown in FIG. 4, related databases, metric, and calls per minute are selected by the user as the related entity 412, datatype 414, and data 416. A graphical representation of the call per minute for the selected related databases for the business transaction customer checkout is shown in the left panel 420.

The data for the related databases are added using widgets as shown in the left panel 420. The user can select any of these and add a new widget by pressing the Add button 418, for example. Adding a widget for a selected entity, datatype, and data drops that widget into the dashboard. For example, selecting related databases drops the metrics for all related databases into the dashboard as shown in FIG. 4.

Figure 5:
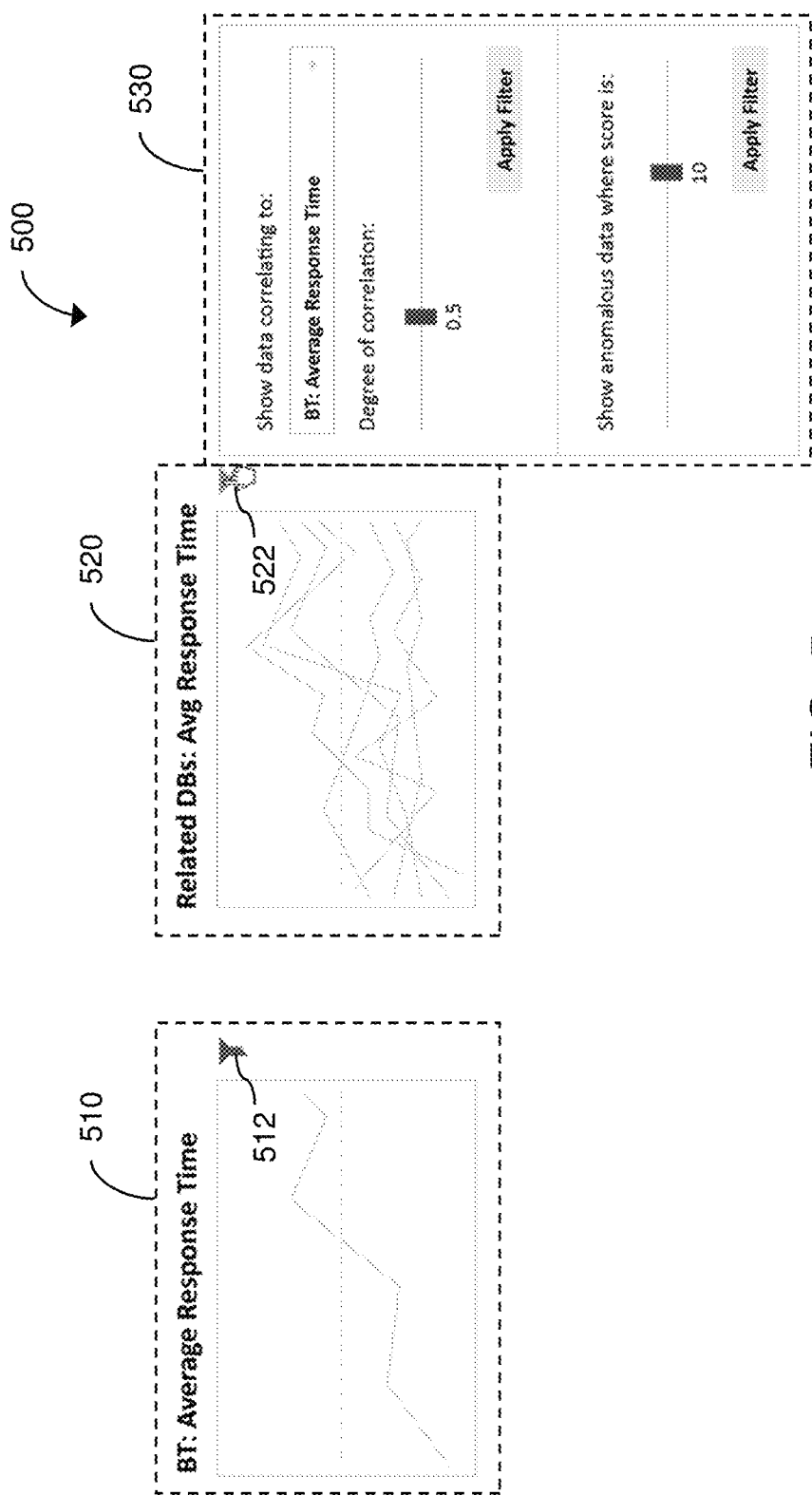
FIG. 5 is a diagram of an exemplary user interface for filtering widgets.

FIG. 5 is a diagram 500 of an exemplary user interface for filtering widgets. As shown in FIG. 5, the added widgets can be filtered to display a subset of the available data in order for the user to drill down to the entities with the interesting subset of data. In the example shown in FIG. 5, two widgets, including business transaction: response time 510 and related DBs: average response time 520 are shown. Each of the widgets can be filtered using a filter interface, such as 512 and 522 shown in FIG. 5. In the example shown in FIG. 5 user selection of the filter interface 522 opens a user selectable interface 530 with different filtering options. For example, the database data can be filtered to obtain the data correlating to specific entities, such as the added related databases metrics data that correlate with the business transaction: average response time, for example. In addition to the user interface that filters the data for those correlating to an entity, the data can be filtered to specify the degree of correlation, and to show anomalous data for a user specified score.

Figure 6:
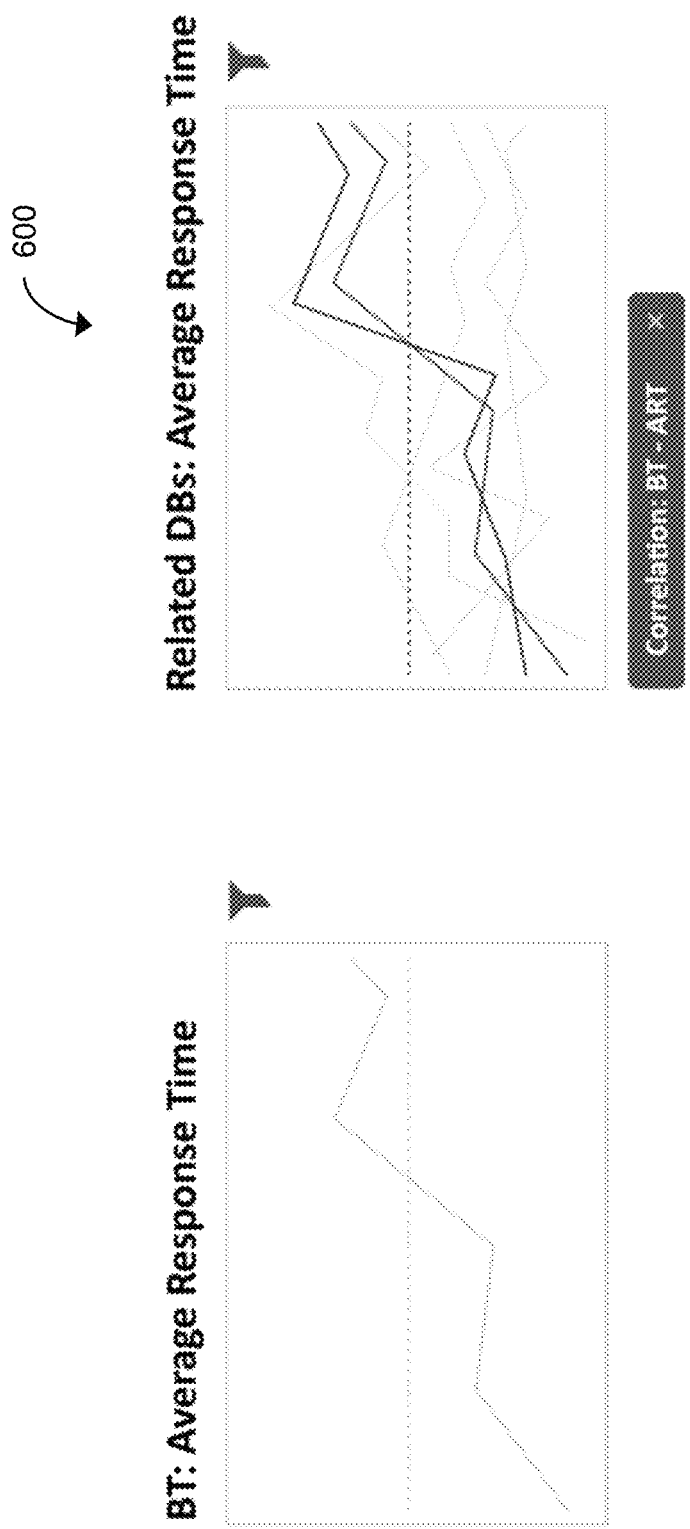
FIG. 6 is a diagram that shows an exemplary result of filtering performing using the user interface of FIG. 5.

FIG. 6 is a diagram 600 that shows an exemplary result of filtering performing using the user interface of FIG. 5. The widgets displaying the data for the related DBs are filtered to show results that correlate to the chosen metric. In the example shown in FIG. 6, only those DBs that correlate to the business transaction: ART are shown in FIG. 6. In this manner, the user can select the next context in the drill down.

Figure 7:
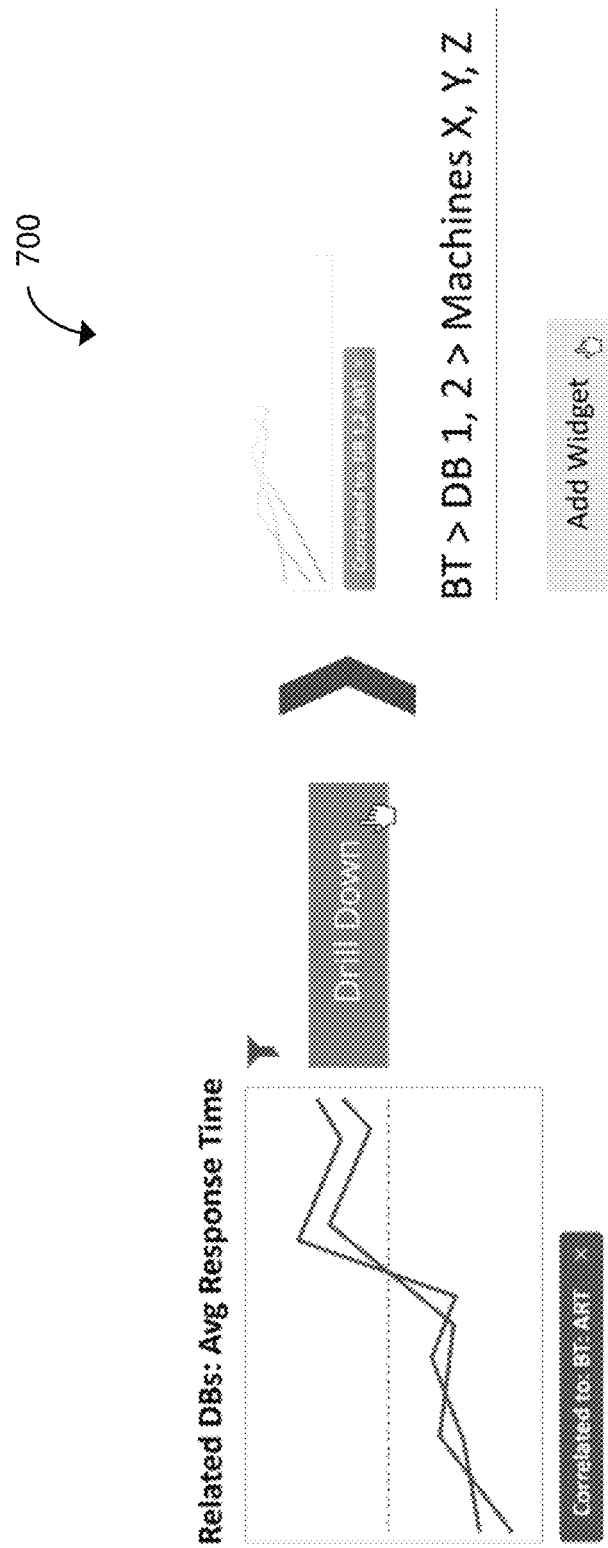
FIG. 7 is a diagram that shows an exemplary context switching for the filtered DBs from FIG. 6.

FIG. 7 is a diagram 700 that shows an exemplary context switching for the filtered DBs from FIG. 6. When the user drills down to the next context for the entities related to the filtered DBs, the set of entities that are related are the entities that are related to the set of DBs that the user selected. In other words, the available related entities are filtered to show only those entities that are related to the DBs that the user specified in the previous context. In the example shown in FIG. 7, the drilling down from the filtered DBs 1 and 2 shows machines X, Y, and Z that are related to the DBs 1 and 2.

Figure 8:
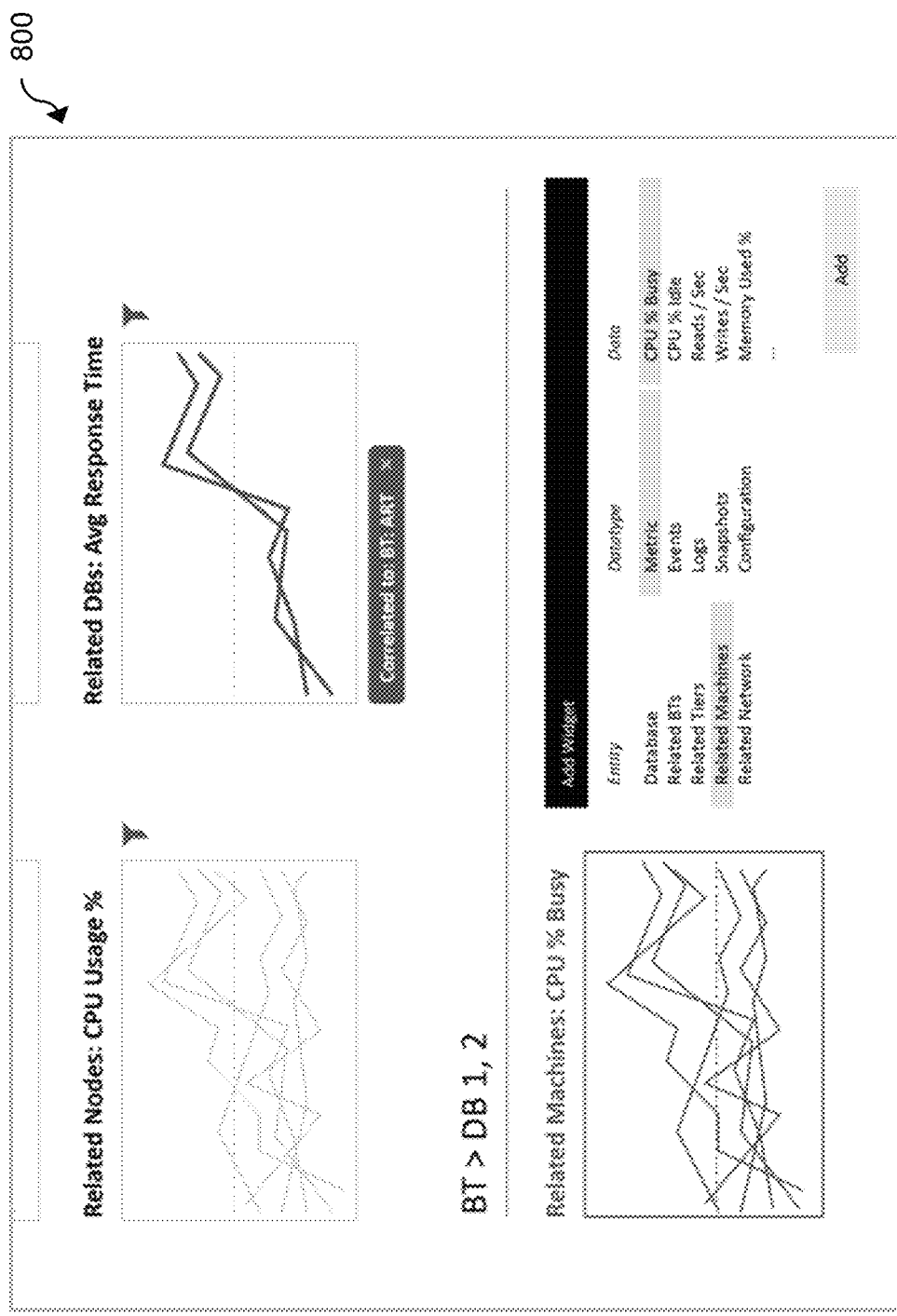
FIG. 8 is a diagram showing an exemplary dashboard of customizable widgets.

FIG. 8 is a diagram 800 showing an exemplary dashboard of customizable widgets. In another aspect, the widgets created on the dashboards can be customized. For example, in addition to adding the widgets as the user changes the context during the drill down, the display location of the added widgets can be moved around the dashboard. In addition, each section and widgets can be renamed.

Figure 9:
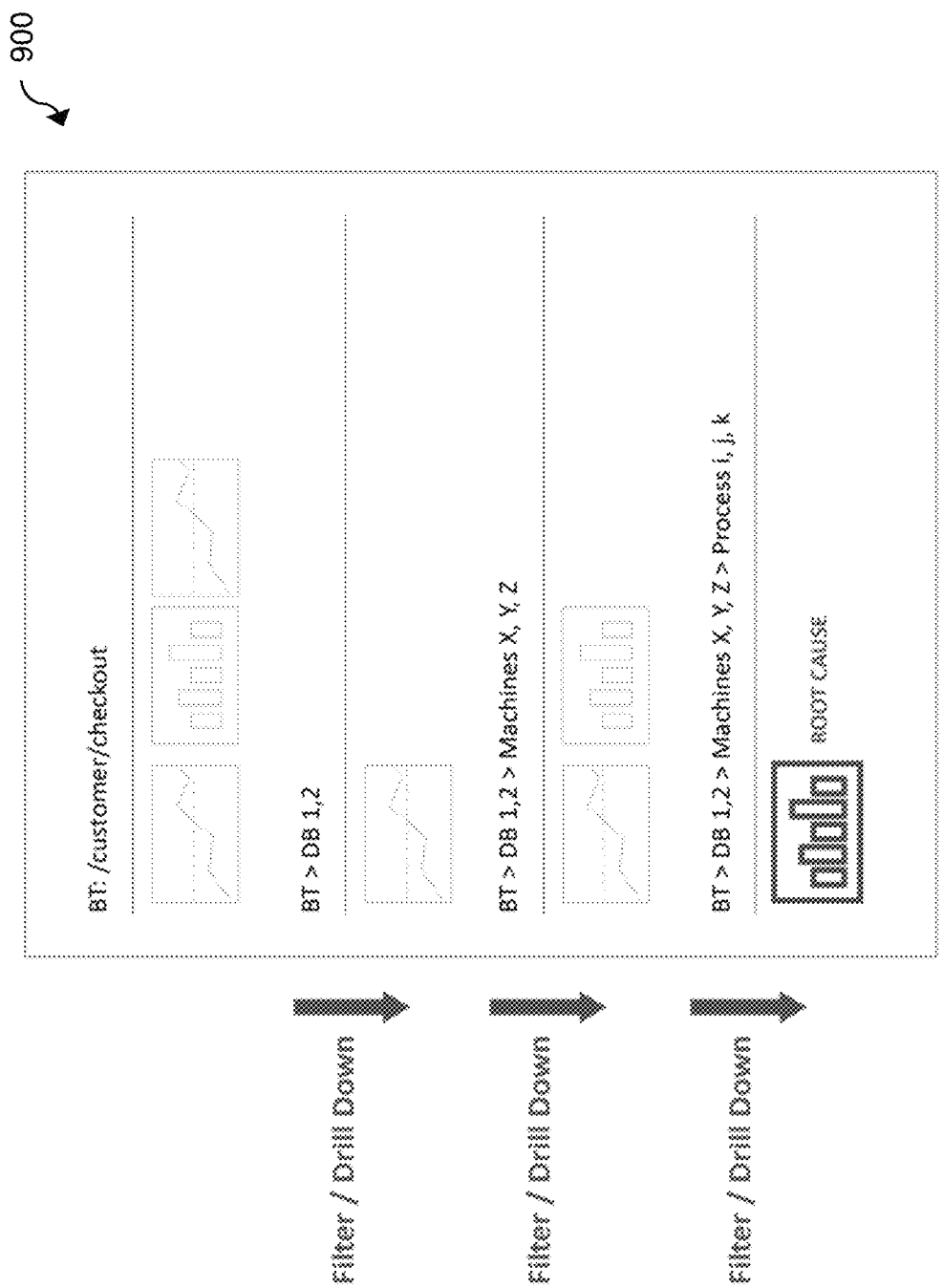
FIG. 9 is a diagram showing an exemplary process for filtering and drilling down the entity relationship model from the starting entity until the root cause is identified.

FIG. 9 is a diagram 900 showing an exemplary process for filtering and drilling down the entity relationship model from the starting entity until the root cause is identified. In the example shown in FIG. 9, the top row represents the starting entity for the guided exploration, business transaction: customer checkout. Then, as shown in the second row, the related DBs are filtered and drilled down to identify those DBs 1 and 2 that are correlated to the specific business transaction. The process of filtering and drilling down is repeated until the root cause is found. For example, in the third row of FIG. 9, the machine entities are filtered to identify only those machines X, Y, and Z that are correlated to the filtered DBs 1 and 2. Then, as shown in fourth row, the related processes are filtered to identify only those processes, i, j, and k that are correlated to filtered machines X, Y, and Z to identify the root cause.

Figure 10:
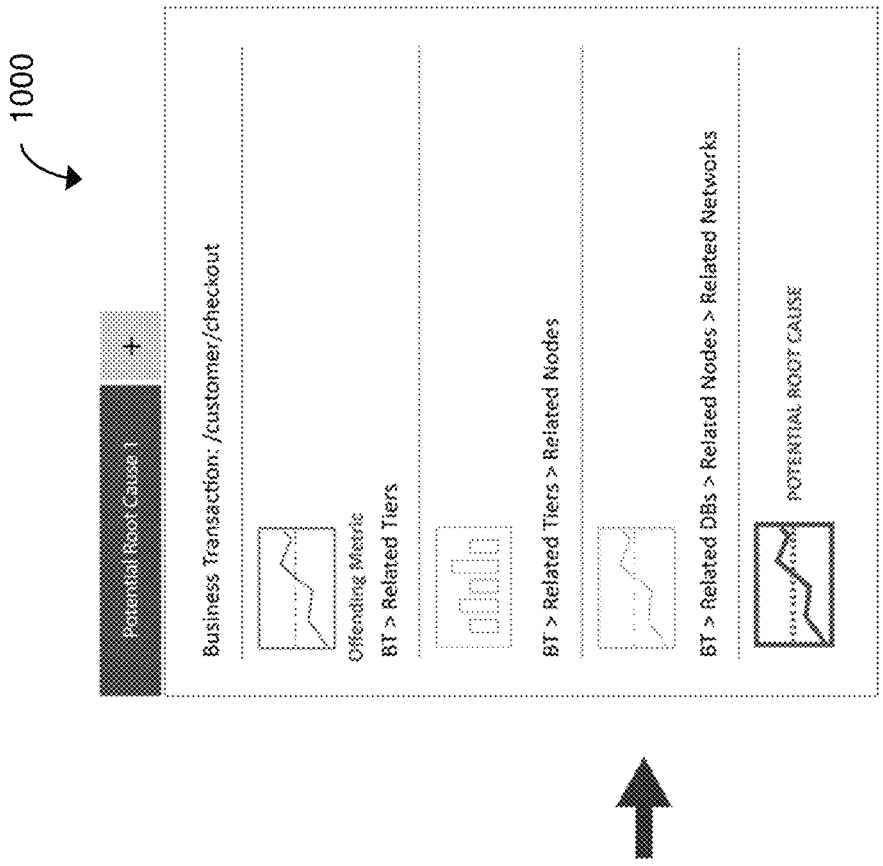
FIG. 10 is a diagram showing an exemplary chain of drill down events during the guided exploration that led to identification of a potential root cause.

FIG. 10 is a diagram 1000 showing an exemplary chain of drill down events during the guided exploration that led to identification of a potential root cause. Because the disclosed guided exploration leaves a visual trail of each context switching performed by the user, guided exploration immediately shows the user how the user actually arrived at the potential root cause of the performance issue. In the example shown in FIG. 10, a visual trail of how each entity is related to the next entity is shown separated by the rows. Thus, the user can follow down or back up the rows of the displayed entity relationships to understand how the entities are related to each other and understand the filtering and selection made at each step by the user. In this manner, each section of the dashboard can represent a node in the graph of entity relationships.

Because the guided exploration creates the visual trail of how one entity in the chain of entities is related to another entity, once the user completes the guided exploration, a template of how the root cause was identified is created. Thus created template can be used by the user to perform another guided exploration simply by swapping out one of the entities in the chain. Any entity can be swapped out to perform the same root cause identification analysis on a different business transaction, DB, machine, process, etc. Swapping out one of the entities in the chain with a new entity changes all other entities in the chain automatically to those entities that are related to the new entity. For example, changing the business transaction to a new business transaction in FIG. 10 will change the related tiers to those related to the new business transaction and filtered using the same filtering (e.g., correlation to the new entity, correlation level, etc.) used in the template. Then the related notes will change to those nodes that are related to the new related tiers and using the same filtering as the template. Then the related DB s will change to new DBs that are related to the new related tiers and using the same filtering as the template. Then the related machines will change automatically to those machines that are related to the new related DBs and using the same filtering as the template. Then the related processes will change to new processes that are related to the new machines and using the same filtering as the template. In another example, changing out the related tiers to new tiers will change the entity up the chain, the business transaction to a new business transaction and using the same filtering as the template. Then the other entities down the chain will automatically change as described in the previous example.

Figure 11:
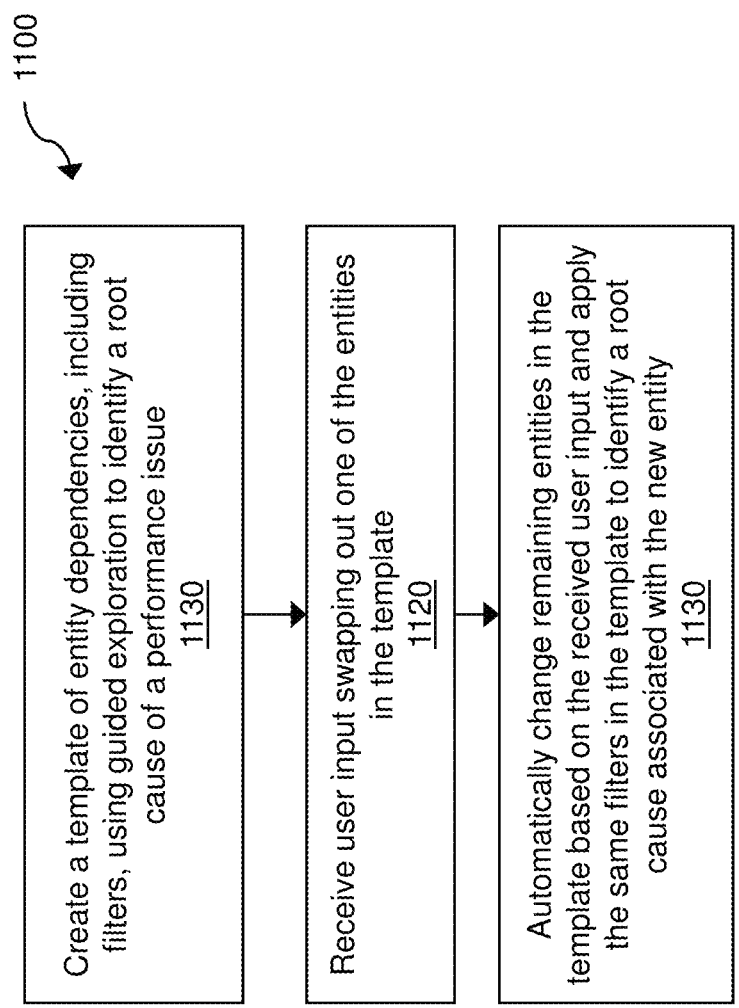
FIG. 11 is a process flow diagram showing an exemplary process for using a template to perform a new root cause analysis.

FIG. 11 is a process flow diagram 1100 showing an exemplary process for using a template to perform a new root cause analysis. As described above, the user can perform guided exploration to identify a root cause of a performance issue and create a resultant template of the guided exploration (1110). The template includes a filter for each entity in a chain of entities that shows how the user arrived at the potential root cause of the performance issue. A user input is received that indicates a request to swap out one of the entities in the chain of entities included in the template (1120). Responsive to the user input requesting one of the entities to be swapped out with a new entity, remaining entities in the chain of entities are automatically changed based on the new entity (1130). As described above, the remaining entities that are automatically changed are changed to new entities that are related to the new entity that user swapped in.

In some implementations, as shown in FIG. 10, the same template created using the guided exploration can be used to show the impact of the root cause and the detected performance issue. For example, the impact of the root cause of the performance issue can be that the European order volume for the customer is down 80%. In addition, the user can drill up the chain of entities instead of drilling down. For example, from the detected business transaction issues, the user can drill up the chain and relate the performance issue to user experience. In another example, the user can relate the business transaction having the performance issue to the number of calls per minute that are being made on a checkout. The ability to drill up can show that the number of orders being completed has dropped.

Figure 12:
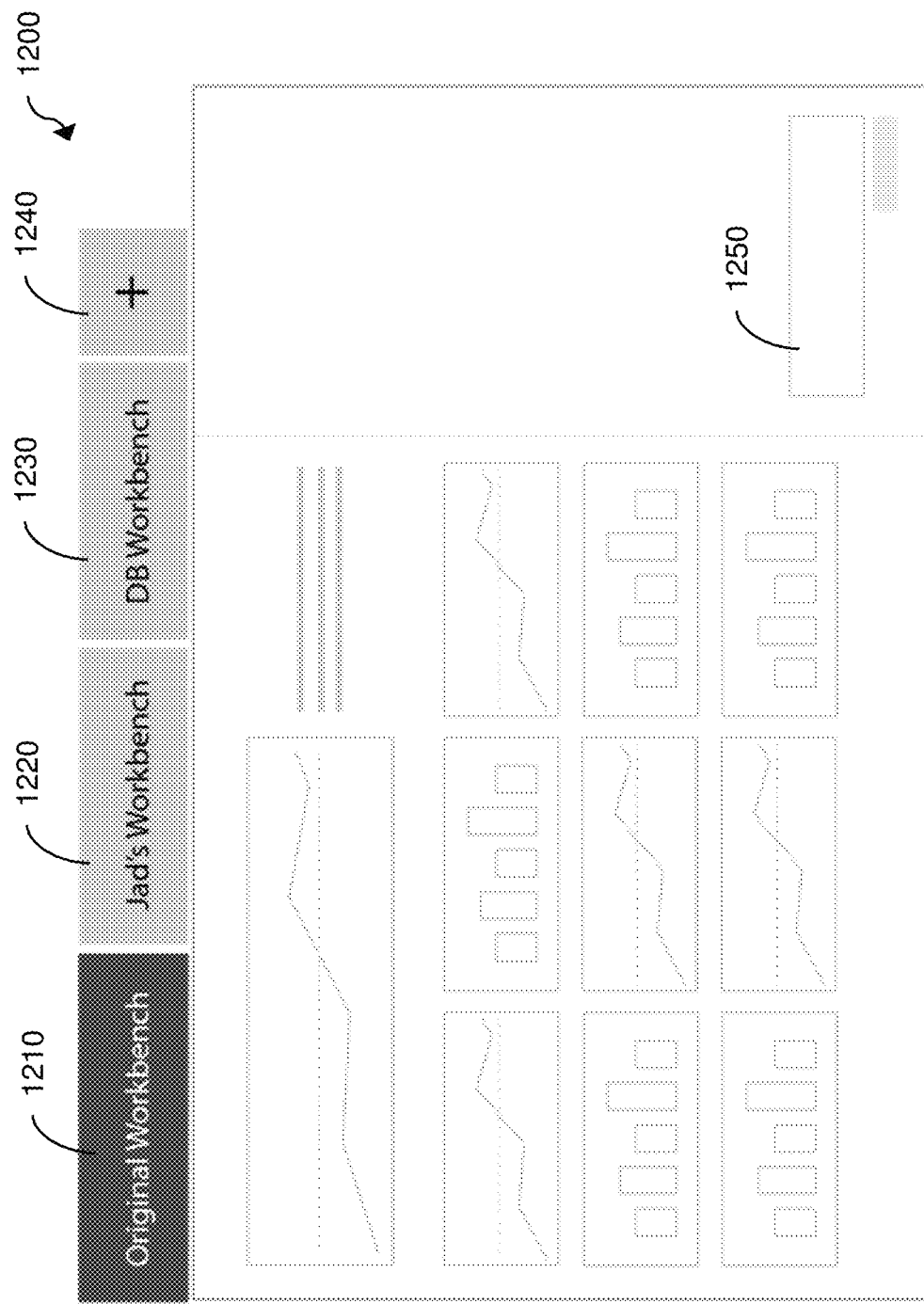
FIG. 12 is a diagram showing an exemplary collaboration tool.

FIG. 12 is a diagram 1200 showing an exemplary collaboration tool. Different users can create different templates by performing different guided explorations and share the resultant template or any other aspects of their guided exploration with each other. In the example shown in FIG. 12, three exemplary workbenches 1210, 1220, 1230 are shown with a user interface 1240 to allow additional workbenches to be added. Each workbench can be selected for viewing as a separate tab on a dashboard. Different team members can create different workbenches and share their workbenches to collaborate on identifying the root cause. In addition, a chat function 1250 can be included for sharing ideas and strategies with team members, for example about the different templates created by different team members. Each user can share his/her own dashboard workbench in real time as the user is performing his/her own guided exploration. In addition to sharing the templates, the users can share widgets created during the guided exploration.

Figure 13:
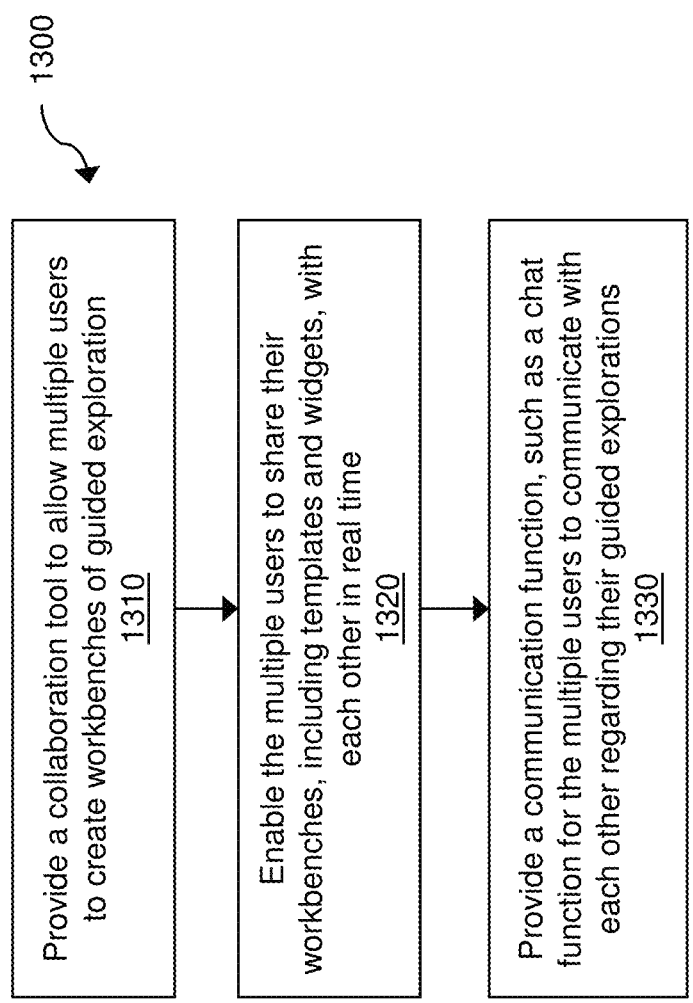
FIG. 13 is a process flow diagram showing an exemplary process for providing a collaboration tool as described with respect to FIG. 12.

FIG. 13 is a process flow diagram 1300 showing an exemplary process for providing a collaboration tool as described with respect to FIG. 12. As described above in FIG. 12, different users can collaborate together to identify the root cause of a common performance issue, such as a slow ART for a given business transaction. A collaboration tool, for example as shown in FIG. 12, can be provided on a dashboard to allow multiple users to create their own workbenches of guided exploration (1310). The collaboration tool can be used to enable the multiple users to share their workbenches, including the templates and widgets, with each other in real time (1320). Such sharing can include sharing each widget during each step of the guided exploration in real time during the guided exploration. In addition, the collaboration tool can be used to provide a communication function, such as a chat function for the multiple users to communicate with each other regarding their guided explorations (1330).

Widget Selections

Different widgets can be available for user selection. The different ones of the available widgets can be selectable based on the entity that the user is interested in reviewing. For example, a given business transaction can have available for selection, widgets for different tiers, machines, databases, backends, and pages associated with the given business transaction. The tiers can have available for selection, widgets for different nodes, machines, backends, databases, downstream tiers, upstream tiers, business transaction, and exit calls associated with the tiers. The nodes can have available for selection, widgets for different tiers, machines, backends, databases, downstream tiers, upstream tiers, business transactions, and exit calls associated with the nodes. The machines can have available for selection, widgets for nodes, processes, and databases associated with the machines. The pages can have available for selection, sessions, business transactions, browsers, and devices associated with the pages. There may be additional widgets available for selection based on a number of factors including the relationships of entities both upstream and downstream of a particular entity.

Widget Filters

Some widget items can be further filtered by a given business transaction. For example, widgets for exit calls, downstream tiers, upstream tiers, databases, and backends can be further filtered by the given business transaction. The filters can be based on the widget item's property values, such as the name, IP address, type, etc.

Automated Model Based Root Cause Analysis

In another aspect, an automated model based root cause analysis is provided to automate what users generally do manually during a root cause analysis of any monitored entity. An example of the monitored entity is a business transaction. However, the monitored entity can be outside the context of any business transaction. A user performing manual root cause analysis tends to take action based on a user-biased assumption on what affects the performance of an entity, such as a business transaction. For example, the user may think that a business transaction is running slower than a threshold (e.g., slow ART) because of a particular tier related to the business transaction. Based on this internal assumption, the user may review the tier and the associated tier data to understand what affects the performance of that tier. The disclosed technology provides for an automated model based root cause analysis that automates the manual processes performed by a user during the root cause analysis.

Dependency Meta Model

A user's understanding of what affects a given entity can be facilitated by generating a dependency meta model that shows how the performance of one entity or object affects the performance of another related object or entity. For example, a dependency meta model as disclosed can describe how Tiers average response time (ART) (e.g., the ART data for the tiers) depends on Tiers Nodes ART (the ART data of nodes in the tiers of interest) Likewise, Tiers Nodes ART response time can depend on Tiers Nodes Machines CPU usage (the CPU usage data for the machines related in the nodes of interest). In this manner, given an entity type, such as a tier, node, or, machine and given a data source type, such as a metric, the disclosed dependency meta model can automatically generate a dependency graph illustrating entity dependency data of other related entities and data sources for the user to review. For example, when a user reviewing a node and the associated ART data for the node, the dependency meta model can generate a list of related entities and data sources to review, such as that node's machine's CPU, that node's DNS configuration, etc. In such manner, based on the identification of an entity and associated data source, the dependency meta model can identify other related entities and data sources that affect that entity's performance. In other words, the dependency meta model describes how performances of different entities affect each other and automate the process.

Figure 14:
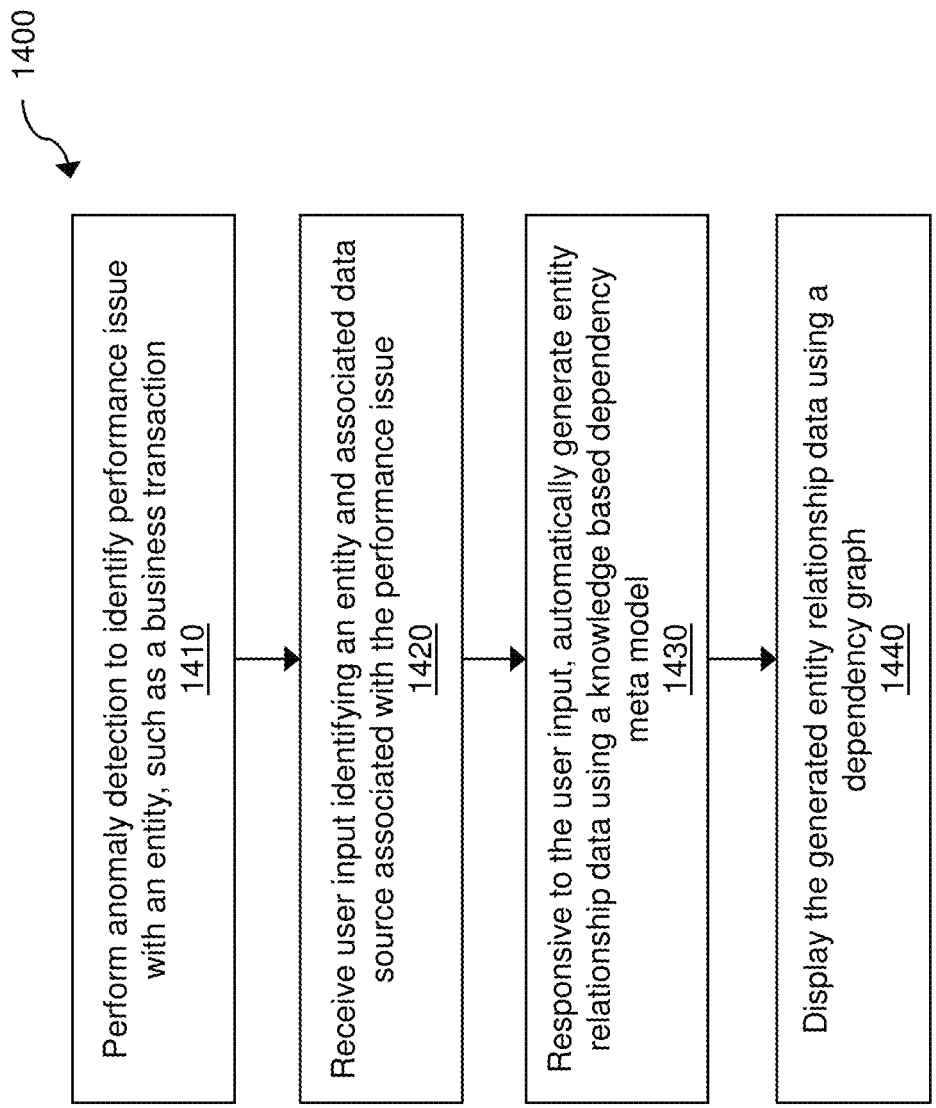
FIG. 14 is a process flow diagram showing an exemplary process for providing automated root cause analysis.

FIG. 14 is a process flow diagram 1400 showing an exemplary process for providing automated root cause analysis. Anomaly detection is performed to identify a performance issue with an entity, such as a business transaction (1410). User input identifying an entity and the associated data source is received (1420). Responsive to the received user input, a knowledge based dependency meta model is used to automatically generate entity relationship data that indicates how entities and data sources are related to each other (1430). The user indicated entity is used as a seed for the dependency meta model to identify entities related to the user indicated entity up and down the chain of relationships. The generated entity relationship data is displayed using a dependency graph that illustrate the relationships among the entities in a chain with each entity linked to a related entity (1440). The user identified entity (and data source) is a node in the dependency graph.

Figure 15:
FIG. 15 is a process flow diagram showing an exemplary process for automatically generating a list of relationships as described with respect to FIG. 14 above.

FIG. 15 is a process flow diagram showing an exemplary process 1430 for automatically generating the entity relationship data as described with respect to FIG. 14 above. Automatically generating the entity relationship data using the knowledge based dependency meta model can include generating a traversal of multiple relationships, data sources, and ratings or scores that indicate how important each relationship is to the performance issue (1432).

Figure 16:
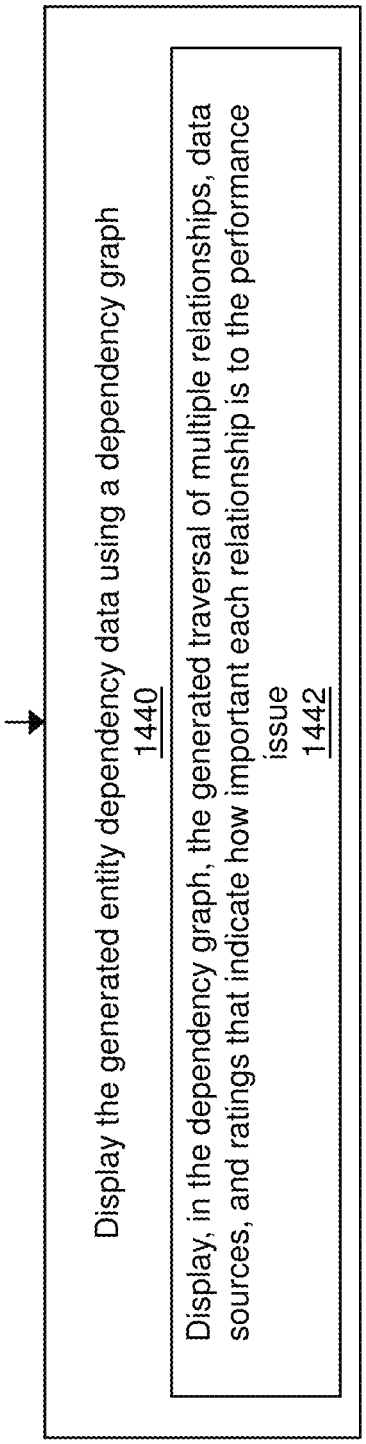
FIG. 16 is a process flow diagram showing an exemplary process for displaying the automatically generated list of relationships as described with respect to FIGS. 14 and 15 above.

FIG. 16 is a process flow diagram showing an exemplary process 1440 for displaying the automatically generated entity relationship data as described with respect to FIGS. 14 and 15 above. Displaying the automatically generated entity relationship data using the knowledge based dependency meta model can include displaying, in the dependency graph, the automatically generated traversal of multiple relationships, data sources, and ratings or scores that indicate how important each relationship is to the performance issue (1442).

The generated and displayed dependency graph shows specifically which entity depends on other entities, which metric depends on other metric, and which metric depends on which configuration. For example, Tier 1 ART (the ART data for Tier 1) for a given business transaction may depend on nodes 1, 2, and 3. The nodes 1, 2, and 3 may depend on certain machines CPU (CPU processing data for the machines). The dependency graph generated and displayed based on the dependency meta model can show how a performance problem trickles down from one point to another.

Figure 17:
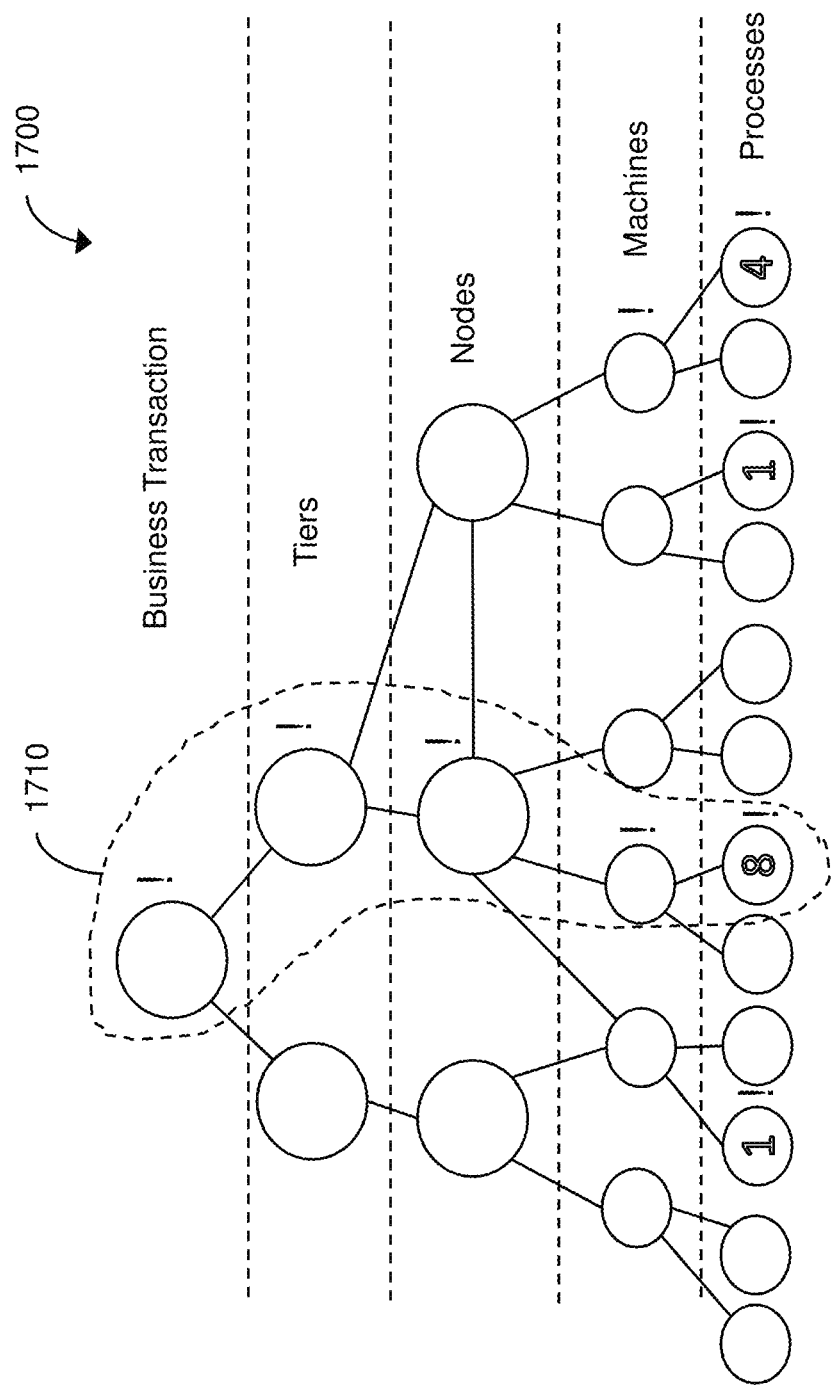
FIG. 17 is a diagram showing an exemplary dependency graph showing how a performance of one entity can trickle down or up from one entity to another.

FIG. 17 is a diagram 1700 showing an exemplary dependency graph showing how a performance problem of one entity can trickle down or up from one entity to another. As shown in FIG. 17, the dependency graph shows a business transaction experiencing a performance issue marked by an exclamation mark (!). The dependency graph also shows two tiers related to the business transaction with the tier on the right side experiencing a performance issue marked by an exclamation mark (!). Attached to the tiers are three nodes related to the two tiers with the node in the middle experiencing a performance issue marked by an exclamation mark (!). Below the nodes are six machines related to the three nodes with two of the machines experiencing a performance issue marked by an exclamation mark (!). Below the machines are 12 processes related to the six machines with four of the processes experiencing a performance issue marked by an exclamation mark (!). Each processor entity is also marked with a score or rating indicating the importance of the processor entity to the overall performance issue experienced by the business transaction. One of the entity dependency paths 1710 is enclosed within a dotted line to show how the performance of the processor marked with a score of '8' affects the third machine from the left, the node in the middle, the tier on the right, and eventually the business transaction. Other nodes in the dependency graph are similarly scored to identify the importance of that node (the data source at that node) to the overall performance issue. Similar dependency graph can be generated using the knowledge based dependency meta model to show how each entity's performance can affect another entity's performance.

Figure 18:
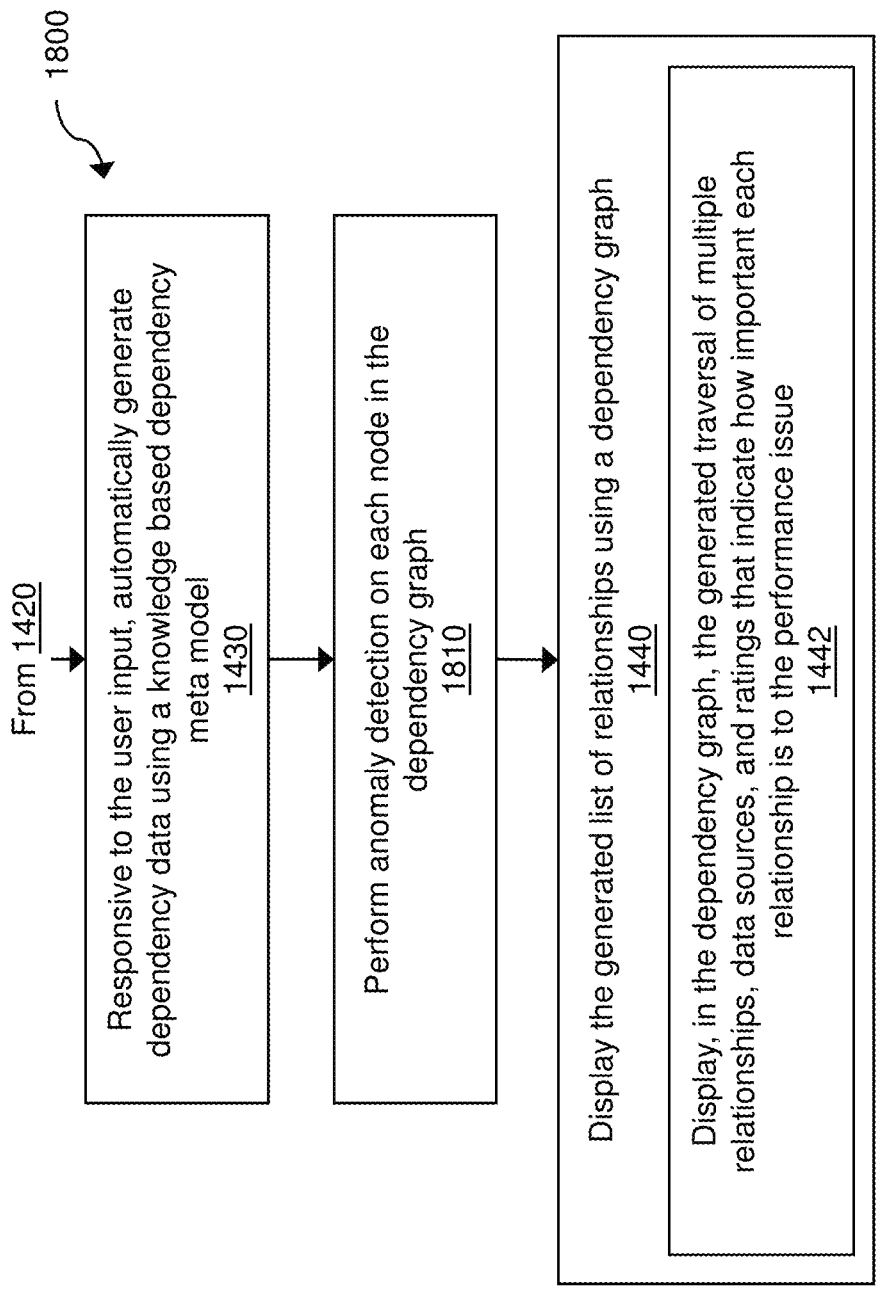
FIG. 18 is a process flow diagram of an exemplary process for scoring or rating each node in the dependency graph.

FIG. 18 is a process flow diagram 1800 of an exemplary process for scoring or rating each node in the dependency graph. As shown in FIGS. 13 through 16, processes 1410, 1420, 1440, and 1442 are performed. However, diagram 1800 includes a process to indicate in the entity dependency graph what is good and what is not good or what is behaving well and what is not behaving well. An anomaly detector can be used to analyze the data source at every node on the dependency graph and determines what is good and what is not (1810). The end result is a score or rating for every data source on the graph with the score or rating indicating the importance of the data source on the overall performance issue with the business transaction. The anomaly detector applied to the dependency graph will show the user, via the score or rating, where the problems are on the dependency graph. Ultimately, using the anomaly detector and the entity dependency graph, the user can perform an automated root cause analysis.

The anomalies identified on the entity dependency graph show which anomaly is the true root cause of the performance issue. For example, each anomaly can be traced along branches of the entity dependency graph to determine which anomaly is likely to be the root cause. For example, if one anomaly is traced up the graph and is not causing additional issues up the graph, that anomaly is not likely to be the root cause.

Anomaly Detection and Root Cause Candidate Clustering

FIG. 19 is a process flow diagram 1900 of an exemplary process flow for identifying root cause candidates and clustering the candidates. A number of anomaly detection algorithms can be applied to the anomalies in the nodes of the dependency graph to determine which of the anomalies is likely to be the root cause of a particular performance issue (1910). Each anomaly in the node is given a score using the anomaly detection algorithms that indicates the likelihood of each anomaly being the root cause of the performance issue. Then clustering algorithms are applied to the identified root cause candidates to aggregate the root cause candidates together (1920). The aggregated groups of root cause candidates are ranked by their scores. By aggregating the root cause candidates across different nodes and branches in the dependency graph with anomalies, the user is able to review aggregated groups of root cause candidates together rather than review each candidate separately. Moreover, reviewing the aggregated groups of root cause candidates enables the user to more quickly identify which anomalies are more likely to be the root cause becomes more efficient and address the group of aggregated candidates in the same manner. In some implementations, clustering algorithms are used to aggregate root cause candidates together and visually overlay the candidates on top of each other to visually group similar anomalies together (1930). This way, the user is able to easily review hundreds of nodes with the same anomalies by visually reviewing the overlaid groups of root cause candidates.

The identified root cause candidates can be aggregated using a number of ways. For example, after building a dependency graph for each performance issue, the dependency graphs are overlaid on top of each other to group the ones that are visually similar. The visually similar groups are reviewed together. In another example, because the meta dependency graph is a cluster already, the dependency graph can be applied on a model, and a graph search can be performed to identify a subset of the dependency graphs that match the model. All the dependency graphs that look the same can be aggregated.

Sharing Data Between Guided Exploration and Automated Root Cause Analysis

In some implementations, the templates generated using the guided exploration can be used as entity dependency models when performing the automated root cause analysis. Thus, the user can affect the model used in the automated root cause analysis. In some implementations, the dependency graphs and scores generated during the automated root cause analysis can be used to influence the list of selectable entities, data types and data presented to the user. For example, the entities with high scores (i.e., likely to be root cause candidates) can be listed higher on the user selectable lists and an indication can be provided, such as the score, to suggest to the user to select the ones with the higher scores.

Analysis for Data Types

Different algorithms for analyzing different data types can be available for each widget selection. The various algorithms for analyzing different data types as disclosed in this patent document can be applied for guided exploration and automated RCA. For guided exploration of RCA, the various algorithms can be used to generate the data displayed by the widgets for the user selected entity and related entity along with their associated data. For automated RCA, the various algorithms can be applied to assigning anomaly scores to various metrics. Using the scores assigned, the disclosed technology can be used to generate the entity relationship model and the associated entity relationship graphs, which reflect the physical relationships of entities in the real world. Moreover, the disclosed algorithms can be applied to both guided exploration and automated root cause analysis.

Metrics Analyzing Algorithm

For example, metrics data type can be provided to allow a selection by the metric name and selection of a desired analysis. Events, such as anomaly events can be analyzed for time-series, correlation, and time-shifted analysis. Logs can be analyzed using time-series, correlation, and time-shifted analysis. Snapshots can be analyzed using score card, method performance, SQL performance, input data analysis, and error correction analysis. Configuration or Metadata can be analyzed using time-series, value correlation, or change correlation.

Examples of selectable analysis include time-series analysis, baseline deviation analysis, and clustering analysis. Time-series analysis can include a selection of different aggregations including none, sum, average, min, max, and percentile. Baseline deviation analysis can include a selection of an analysis of select values including percent and relative deviation. Baseline deviation can also include a selection of an analysis of different aggregations including none, sum, average, min, max, and percentile. Clustering analysis can include selecting different aggregation over a time range including the average, max, min, sum, and percentile. The result of the clustering analysis can be presented using a clustering chart that aggregates the desired metric value over time range vs. cluster size.

Events Analyzing Algorithm: Detecting Events Correlated with Metric Anomalies

Another algorithm includes analysis of events, such as an anomaly event, that provide a selection of an analysis of the events based on time-series, correlation analysis, and time-shifted analysis. For example, the time-series analysis of the events can include a selection of the event types and other filters of the selected events in time-series.

The correlation analysis can also include a selection of different event types and other filters for correlating the events. In addition, the correlation analysis can allow for a selection of a particular correlation metric from the board result including for every entity or for every event type. For every entity, the metric anomaly time-series can be calculated over the given time range. For every event type, two random variables whose correlation is to be measured are defined as X (Time, Entity): the event occurrence step function, 0 before the event, 1 after the event; and Y (Time, Entity): the metric anomaly score. The correlation between X and Y are calculated and the correlation vs. event type is output as a graph or a chart.

The time-shifted analysis of the events include a selection of an event type, correlation metric from the board, and what to do with entities that don't have such events (e.g., show graph for the period time range or hide completely). The result of the time-shifted analysis can be shown in a graph or a chart with the time shifted views of all the metrics as if the vent happened at the same time.

These events based analyses can be used to find events in the system that may have caused metric anomalies. FIGS. 20A and 20B are process flow diagrams of processes 2000 and 2002 for finding events in a system that may be the cause of metric anomalies. We probably want to say here that we are already operating in the context of some entities. When in guided exploration, this context is established by the user selecting either the anomalous entity to troubleshoot or some related set of entities. A metric is selected whose anomalous behavior is to be correlated to events (2010). For every entity in the system, calculate an anomaly score corresponding to each data point in the metric time series (2020). Then for every event type, calculate the correlation between the event occurrence and the metric anomaly score (2030). This can be formulated as two 2-dimensional random variables X(time, entity)=event occurrence step function, which is 0 before the event and 1 after, and Y(time, entity)=metric anomaly score (e.g. % deviation from baseline) (2032). Events with the highest correlation are identified as likely related to the anomaly (2040).

For example, a hard disk failure may raise an event that could be related to reduced IO throughput from a RAID storage array. Typically, in absence of the disclosed technology, users are forced to manually look through the events to determine whether the events occurred close in time to metric anomalies. Such manual determination may be made by overlaying the events on top of the metrics. Additionally, such manual determination is performed individually for each entity rather than across the entire system.

Logs Analyzing Algorithm: Detecting Log Messages Correlated with Metric Anomalies A logs based analysis algorithm can be used to detect log messages correlated with metric anomalies. Such a logs based algorithm allows analysis of the logs using time-series, correlation, and time-shifted analysis. Analyzing logs in time-series include allowing for a selection of the logs and the different filters including the severity, regex, field values, etc.

Correlation analysis of the logs include a selection of different logs, and different correlation metrics from the dashboard. The results of the correlation analysis can be provided as a graph, chart, etc. to identify the most common words or phrases across all entities and sort the results, such as in decreasing order of uniqueness over time for each entity. The results can also be provided to identify those that are similar to the events by defining two random variables whose correlation is to be measured are defined as X (Time, Entity): the word or phrase occurrence step function; and Y (Time, Entity): the metric anomaly score. The correlation between X and Y are calculated and the correlation vs. word or phrase is output as a graph or a chart.

FIGS. 21A and 21B are process flow diagrams of processes 2100 and 2102 for performing logs based analysis to identify any words or phrases in the log messages that correlate with metric anomalies. The time-shifted analysis of the logs are similar to the time-shifted analysis of the events described above. Specifically, the disclosed algorithm for analyzing logs is very similar to "Detecting Events Related to Metric Anomalies." However, the logs based algorithm is implemented to detect log messages that may have some useful information when correlated to metric anomalies. Rather than events, words and phrases from log messages are selected (2110). An anomaly score corresponding to each data point in the metric time series is determined for each entity (2120). The selected words and phrases from log messages are correlated with metric anomalies scores (2130). This can be formulated as two 2-dimensional random variables X(time, entity)=word or phrase occurrence step function, which is 0 before the word or phrase and 1 after, and Y(time, entity)=metric anomaly score (e.g. % deviation from baseline) (2132). The word or phrase with the highest correlation is identified as a likely candidate to relate to the anomaly (2140).

The same example described for the events analysis is applicable for the logs based analysis. For example, a hard disk failure may raise an event that could be related to reduced IO throughput from a RAID storage array. Normally, in absence of the disclosed technology, users are forced to manually look through log messages to manually determine whether any words or phrases from the log messages are related to metric anomalies including close in time to occurrence of metric anomalies. Such manual determination is made usually by overlaying the times series of the words and phrases on top of the metrics. Additionally, such manual determination is performed individually for each entity rather than across the entire system.

Time-Shifted Event Graph to Understand Metric Behavior as Related to an Event

In another aspect, time-shifted event graphs can be generated to help users understand how an event impact metric behavior. FIG. 22 is a process flow diagram showing an exemplary process 2200 for generating time-shifted event graphs to help users understand the impact of an event on matric behavior. An event that causes metric anomaly at a given entity is identified (2210). The anomaly may propagate across machines or nodes and it may happen at different times on different machines or nodes (e.g. network failure or DNS problem), but it may impact all related entities the same way (e.g. latency increases). A user may want to determine whether that is really the case. To determine whether the same event impacts all entities in the same way, the metric graphs (or a derived version of the metric graph such as an anomaly score graph) for each entity are generated (2220) and overlaid with the event for that entity (2230). Then the x-axis can be time-shifted on all the graphs such that the event appears to occur at the same position on the x-axis (2240). Using the time-shifted graphs, the metric behavior can then be visually identified as either all the metrics on top of each other or as an aggregation of all the metrics.

This same time-shifted metric graph analysis can be applied to log messages. FIG. 23 is a process flow diagrams showing an exemplary process 2200 for generating time-shifted log graphs to help users understand the impact of a log message on matric behavior. A word or phrase from a log message that causes metric anomaly at a given entity is identified (2310). The anomaly may propagate across machines or nodes and it may happen at different times on different machines or nodes (e.g. network failure or DNS problem), but it may impact all the entities the same way (e.g. latency increases). A user may want to determine whether that is really the case. To determine whether the same word or phrase from a log message impacts all related entities in the same way, the metric graphs (or a derived version of the metric graph such as an anomaly score graph) for each entity are generated (2320) and overlaid with the associated word or phrase from the log message for that entity (2330). Then the x-axis can be time-shifted on all the graphs such that the word or phrase appears to occur at the same position on the x-axis (2240). Using the time-shifted graphs, the metric behavior can then be visually identified as either all the metrics on top of each other or as an aggregation of all the metrics.

The disclosed time-shifted graph analysis is useful to identify an anomaly that is affecting all related entities, such as nodes across the monitored system. For example, the disclosed time-shifted graphs can be used to show how a DNS problem that raised an event caused high latencies in the response time across all nodes that experienced the DNS problem. Rather than reviewing the metric and event for each entity separately, all graphs are plotted on top of each other to clearly illustrate the impact of the event on the metric, especially if the events are far from each other.

Snapshot Analyzing Algorithm

Yet another exemplary data type for analysis include snapshot analysis. For example, score card analysis provides a snapshot performance using a vertically stacked bar chart for slow, very slow, stall, error, and normal performance. The method performance analysis provides a snapshot for every method that shows the baseline calculated by averaging self-completion time across normal snapshots. Also, for every method, the average deviation from the baseline is calculated in non-normal snapshots. These snapshots can show a horizontal bar char with the % deviation from the baseline (or % anomaly) as the metric and the top 10-20 deviating methods. The SQL performance snapshots can be provided using the same analysis as described with respect to the method performance.

Input data analysis snapshots can provide for each K=key, V=value pair, the % occurrences calculated in normal, error, stall, slow, and very slow snapshots. Those K, V pairs that have the same distributions and the same K can be grouped together. The results of the input data analysis can be provided using a horizontal stacked bar chart that shows the K, V group scorecard sorted by worst (e.g., % error*error weight+% stall*stall weight, etc.)

Error correction analysis snapshots can provide a selection of correlation metric and group similar errors across snapshots. This can include calculating the correlation for X(Entity): % error occurrences for entity in snapshots for every error type identified in the snapshots and Y(Entity): metric anomaly score for the time range. The result of the correlation can be presented using, for example, a horizontal bar chart for most correlated error groups.

Configuration or Metadata Analyzing Algorithm

Another example of the data type includes configuration or metadata that provides for a selection of different analysis in time-series, value correlation, and change correlation. The time-series analysis for configuration or metadata includes showing when changes to the configuration values happen. This can be done by showing the changes when the user hover over the time series, for example. The changes shown can include details of the changes.

The value correlation analysis for configuration or metadata can include, for each key, providing a selection of correlation metric with X(Time, Entity) defined as a hash of the value over time and Y(Time, Entity) defined as the metric anomaly over time. The results of the value correlation can be presented using, for example, a horizontal bar chart where the y axis is the configuration values.

The change correlation analysis for configuration or metadata can include providing a selection of correlation metric and optional selection of configuration tags. For example, when the user is correlating with a CPU metric, the user may only want review the CPU-related configurations. Also, the grouping selection can be provided by time. For example, the changes that happen at the same time can be grouped together. For each configuration, changes can be grouped based on when the changes happen. This can include defining X(Time, Entity) as 0 before the change and 1 after the change; and Y(Time, Entity) as the metric anomaly over time. The result of the grouping by time can be presented using, for example, a horizontal bar chart where the y axis is the set of changes that happen at the same time. In some implementations, the grouping can be by keys. For example, configuration keys can be grouped by defining X(Time, Entity) as 0 before the change, and 1 after a change; and Y(Time, Entity) as the metric anomaly over time. The result of the grouping by keys can be presented using, for example, a horizontal bar chat where the y axis is a set of keys whose change is correlated with the anomaly.

Finding Suspicious Methods During RCA by Mining Snapshot Data

Figures 24, 25:
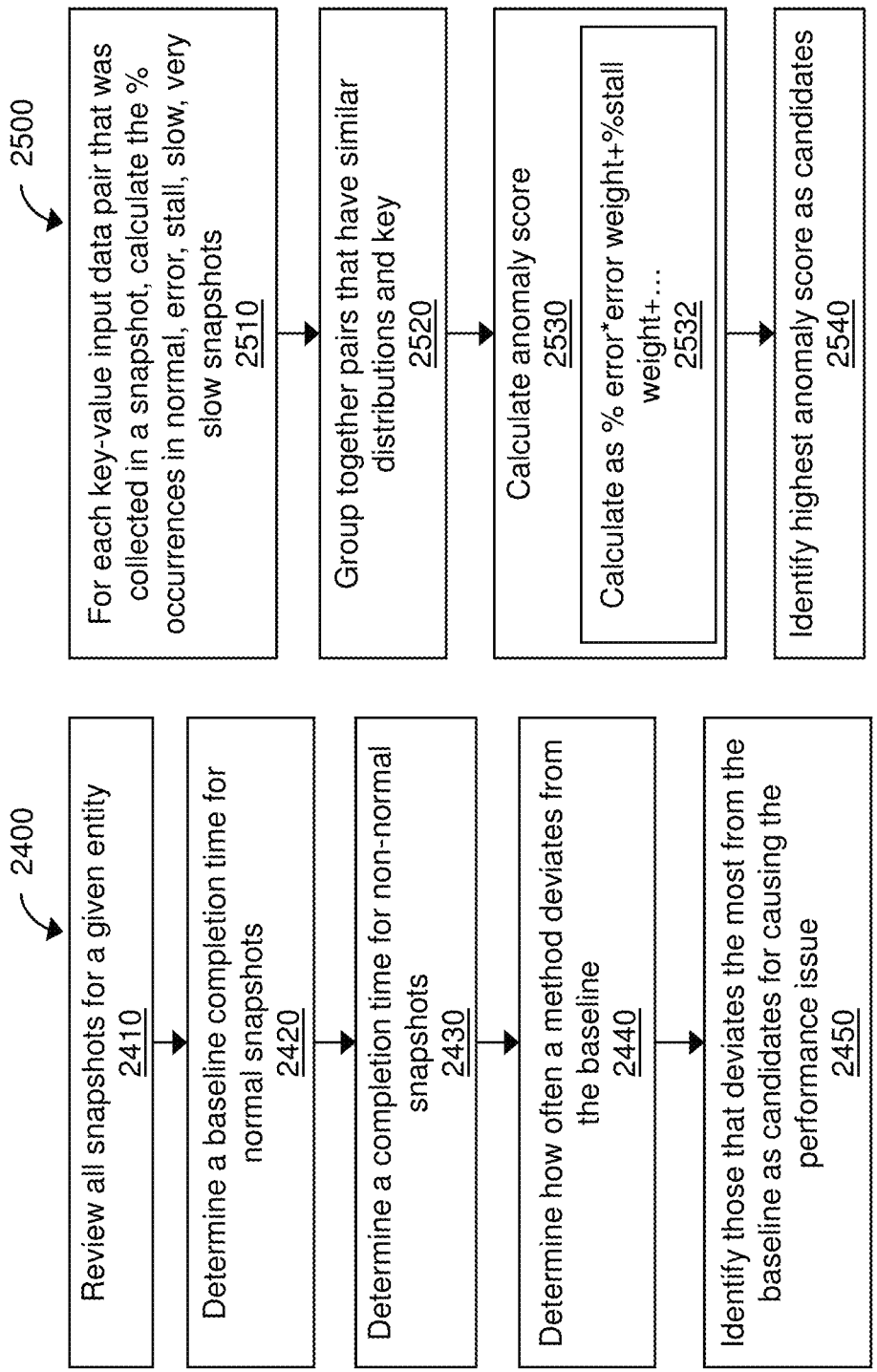
FIG. 24 is a process flow diagram of an exemplary process for finding methods that might be causing performance issues by mining snapshot data.
FIG. 25 is a process flow diagram of an exemplary process for identifying inputs that may cause performance issues.

FIG. 24 is a process flow diagram of an exemplary process 2400 for finding methods that might be causing performance issues by mining snapshot data. All snapshots for a given entity, such as a business transaction are reviewed over a limited time-range that provides enough data points (2410). A baseline of completion time is calculated for each method in all normal snapshots (2420). The baseline can additionally indicate the max and min values. The baseline completion time for the normal snapshots indicates the normal behavior for each method. The same completion time value is calculated over non-normal snapshots (2430). A calculation is performed to determine how often a method goes outside the baseline min and max range by comparing the completion time values for the non-normal snapshots with the baseline completion time values for the normal snapshots (2440). Methods that deviate the most from the baseline in both frequency and value are identified as candidates for causing the performance issue and can be prioritized that way (2450).

The same algorithm disclosed for FIG. 24 can be used to mine for SQL query performance and for remote call performance.

One use case is where a new version of code has been deployed, and the new version of a certain method becomes expensive (processing-wise) to call but only sometimes. Finding which method is problematic may be difficult. Without the disclosed technology, it is not feasible to understand what is "normal" behavior of a given method.

Detecting Input Data Causing Errors or Performance Problems

In some instance, user-specified inputs may cause performance problems. FIG. 25 is a process flow diagram of an exemplary process 2500 for identifying inputs that may cause performance issues. For each key-value input data pair that was collected in a snapshot, calculate the % occurrences in normal, error, stall, slow, very slow snapshots (2510). Group together pairs that have similar distributions and the same key (2520). Having similar distributions and key indicate a key with problematic values (e.g. large input or special characters in the value). Calculate the anomaly score (2530). For example, the anomaly score can be calculated as % error*error weight+% stall*stall weight+ . . . . (2532). The highest anomaly scores indicate the most likely culprits (2540).

A large user input may take a different data path in the code and might be slow to process. The method as disclosed in FIG. 25 can make it easier to find that out.

Snapshot Error Correlation Analysis

There may be a large number of "normal" errors (e.g. HTTP responses with status code 404 or timeout) in an application, and those errors are captured by a snapshotting mechanism. FIG. 26 is a process flow diagram of an exemplary process 2600 for identifying errors that are related to real performance issues. A user selection of a metric to correlate errors against is received (2610). Similar errors across snapshots are grouped together using clustering on the data in the error (2620). Correlate the error occurrence in snapshots related to an entity with the anomaly score for the correlation metric on that entity (2630). This can be formulated as the correlation between two random variable X(entity)=% error occurrences in snapshots related to entity and Y(entity)=metric anomaly score for that entity over a selected time-range (2632).

Method for Identifying Configuration Values that May Trigger Performance Anomalies Identifying configuration values that can trigger performance issues is a difficult problem to address. FIG. 27 is a process flow diagram of an exemplary process 2700 for identifying certain configuration values that lead to issues in performance. The value of all configuration variables are correlated with metric anomalies. Receive user selection of a metric (or set of metrics) for correlating with configuration values (2710). The user selected metric or set of metrics is correlated with configuration values (2720). Correlating the metric or set of metrics with configuration values include correlating the following two random variables X(Time, Entity)=hash of a configuration value for a particular entity or related to that entity over time if the configuration variable is discrete or the actual value if the value is numeric, and Y(Time, Entity)=selected metric anomaly score for the entity over time (2722). The correlation is performed for all configuration variables that are of interest. In some implementations, the configuration variables may be filtered via a model which describes which configuration variables are interesting (2730). Identify the configuration variables that have the highest correlation as candidates for causing performance issues (2740). The disclosed correlation includes all correlations performed between configuration variables and metric anomalies.

An application may have been deployed on various types of hardware machines. Some of those machines may have a slower CPU, and thus leading to lower performance. The disclosed algorithm according to FIG. 27 can enable the user to identify that the CPU speed configuration variable is causing the performance problem. Another example is DNS configuration.

Application Intelligence Platform Architecture

Figure 28:
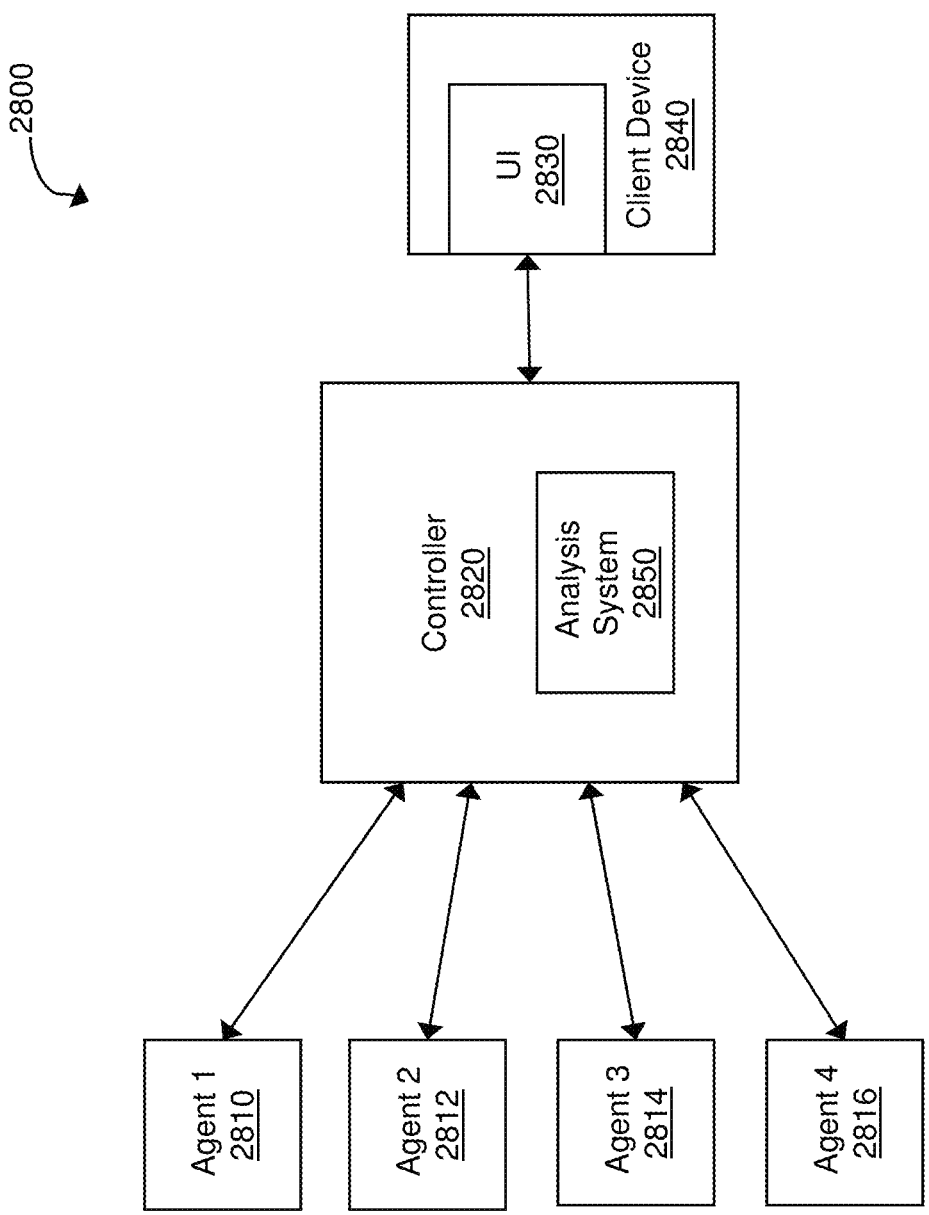
FIG. 28 is a block diagram of an exemplary application intelligence platform that can provide the guided exploration and automated root cause analysis as disclosed in this patent document.

FIG. 28 is a block diagram of an exemplary application intelligence platform 2800 that can implement the guided exploration and automated root cause analysis as disclosed in this patent document. The application intelligence platform is a system that monitors and collect metrics of performance data for an application environment being monitored. At the simplest structure, the application intelligence platform includes one or more agents 2810, 2812, 2814, 2816 and one or more controllers 2820. While FIG. 28 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 2820 is the central processing and administration server for the application intelligence platform. The controller 2820 serves a browser-based user interface (UI) 2830 that is the primary interface for monitoring, analyzing, and troubleshooting the monitored environment. The controller 2820 can control and manage monitoring of business transactions distributed over application servers. Specifically, the controller 2820 can receive runtime data from agents 2810, 2812, 2814, 2816 and coordinators, associate portions of business transaction data, communicate with agents to configure collection of runtime data, and provide performance data and reporting through the interface 2830. The interface 2830 may be viewed as a web-based interface viewable by a client device 2840. In some implementations, a client device 2840 can directly communicate with controller 2820 to view an interface for monitoring data.

In the Software as a Service (SaaS) implementation, a controller instance 2820 is hosted remotely by a provider of the application intelligence platform 2800. In the on-premise (On-Prem) implementation, a controller instance 2820 is installed locally and self-administered.

The controllers 2820 receive data from different agents 2810, 2812, 2814, 2816 deployed to monitor applications, databases and database servers, servers, and end user clients for the monitored environment. Any of the agents 2810, 2812, 2814, 2816 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 2820 can include an analysis system 2850 for provide the guided exploration and automated root cause analysis as disclosed in this patent document. In some implementations, the analytics system 2850 can be implemented in a separate machine (e.g., a server) different from the one hosting the controller 2820.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows between tiers and can be visualized in a flow map using lines between tiers. In addition, the lines indicating the traffic flows between tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of an average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 29:
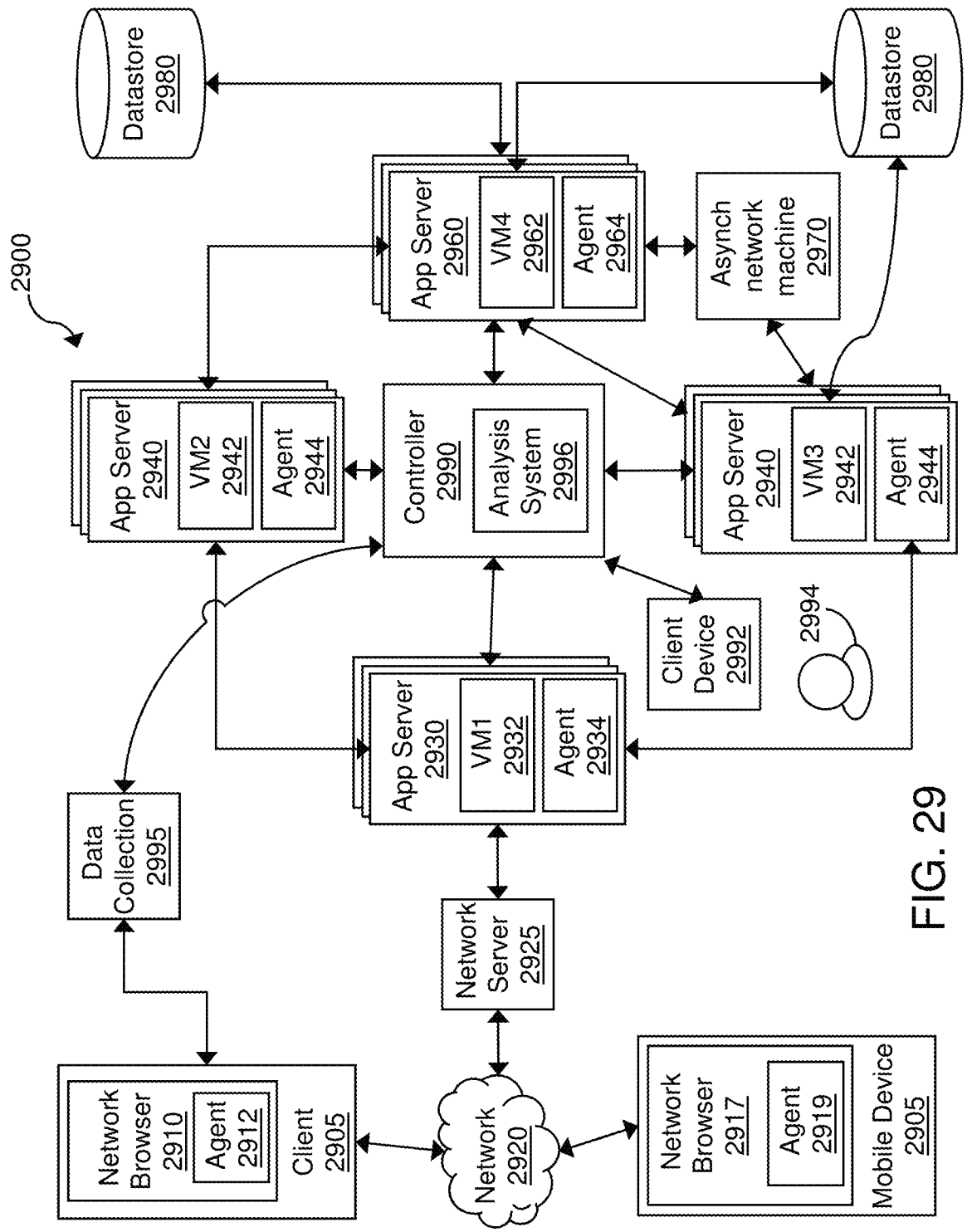
FIG. 29 is a block diagram of an exemplary system for provide the guided exploration and automated root cause analysis as disclosed in this patent document, including the processes disclosed with respect to FIGS. 1-28.

FIG. 29 is a block diagram of an exemplary system 2900 for providing guided exploration and automated root cause analysis as disclosed in this patent document, including the processes disclosed with respect to FIGS. 1-28. The system 2900 in FIG. 29 includes client device 2905 and 2992, mobile device 2915, network 2920, network server 2925, application servers 2930, 2940, 2950 and 2960, asynchronous network machine 2970, data stores 2980 and 2985, controller 2990, and data collection server 2995. The controller 2990 can include an analysis system 2996 for providing guided exploration and automated root cause analysis as disclosed in this patent document. In some implementations, the analysis system 2996 can be implemented in a separate machine (e.g., a server) different from the one hosting the controller 2990.

Client device 2905 may include network browser 2910 and be implemented as a computing device, such as for example a laptop, desktop, workstation, or some other computing device. Network browser 2910 may be a client application for viewing content provided by an application server, such as application server 2930 via network server 2925 over network 2920.

Network browser 2910 may include agent 2912. Agent 2912 may be installed on network browser 2910 and/or client 2905 as a network browser add-on, downloading the application to the server, or in some other manner. Agent 2912 may be executed to monitor network browser 2910, the operating system of client 2905, and any other application, API, or other component of client 2905. Agent 2912 may determine network browser navigation timing metrics, access browser cookies, monitor code, and transmit data to data collection 2960, controller 2990, or another device. Agent 2912 may perform other operations related to monitoring a request or a network at client 2905 as discussed herein.

Mobile device 2915 is connected to network 2920 and may be implemented as a portable device suitable for sending and receiving content over a network, such as for example a mobile phone, smart phone, tablet computer, or other portable device. Both client device 2905 and mobile device 2915 may include hardware and/or software configured to access a web service provided by network server 2925.

Mobile device 2915 may include network browser 2917 and an agent 2919. Mobile device may also include client applications and other code that may be monitored by agent 2919. Agent 2919 may reside in and/or communicate with network browser 2917, as well as communicate with other applications, an operating system, APIs and other hardware and software on mobile device 2915. Agent 2919 may have similar functionality as that described herein for agent 2912 on client 2905, and may repot data to data collection server 2960 and/or controller 2990.

Network 2920 may facilitate communication of data between different servers, devices and machines of system 2900 (some connections shown with lines to network 2920, some not shown). The network may be implemented as a private network, public network, intranet, the Internet, a cellular network, Wi-Fi network, VoIP network, or a combination of one or more of these networks. The network 2920 may include one or more machines such as load balance machines and other machines.

Network server 2925 is connected to network 2920 and may receive and process requests received over network 2920. Network server 2925 may be implemented as one or more servers implementing a network service, and may be implemented on the same machine as application server 2930 or one or more separate machines. When network 2920 is the Internet, network server 2925 may be implemented as a web server.

Application server 2930 communicates with network server 2925, application servers 2940 and 2950, and controller 2990. Application server 290 may also communicate with other machines and devices (not illustrated in FIG. 29). Application server 2930 may host an application or portions of a distributed application. The host application 2932 may be in one of many platforms, such as including a Java, PHP, .Net, and Node.JS, be implemented as a Java virtual machine, or include some other host type. Application server 2930 may also include one or more agents 2934 (i.e. "modules"), including a language agent, machine agent, and network agent, and other software modules. Application server 2930 may be implemented as one server or multiple servers as illustrated in FIG. 29.

Application 2932 and other software on application server 2930 may be instrumented using byte code insertion, or byte code instrumentation (BCI), to modify the object code of the application or other software. The instrumented object code may include code used to detect calls received by application 2932, calls sent by application 2932, and communicate with agent 2934 during execution of the application. BCI may also be used to monitor one or more sockets of the application and/or application server in order to monitor the socket and capture packets coming over the socket.

In some embodiments, server 2930 may include applications and/or code other than a virtual machine. For example, servers 2930, 2940, 2950, and 2960 may each include Java code, .Net code, PHP code, Ruby code, C code, C++ or other binary code to implement applications and process requests received from a remote source. References to a virtual machine with respect to an application server are intended to be for exemplary purposes only.

Agents 2934 on application server 2930 may be installed, downloaded, embedded, or otherwise provided on application server 2930. For example, agents 2934 may be provided in server 2930 by instrumentation of object code, downloading the agents to the server, or in some other manner. Agent 2934 may be executed to monitor application server 2930, monitor code running in a virtual machine 2932 (or other program language, such as a PHP, .Net, or C program), machine resources, network layer data, and communicate with byte instrumented code on application server 2930 and one or more applications on application server 2930.

Each of agents 2934, 2944, 2954 and 2964 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 2934 may detect operations such as receiving calls and sending requests by application server 2930, resource usage, and incoming packets. Agent 2934 may receive data, process the data, for example by aggregating data into metrics, and transmit the data and/or metrics to controller 2990. Agent 2934 may perform other operations related to monitoring applications and application server 2930 as discussed herein. For example, agent 2934 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 2990 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 2934 may create a request identifier for a request received by server 2930 (for example, a request received by a client 2905 or 2915 associated with a user or another source). The request identifier may be sent to client 2905 or mobile device 2915, whichever device sent the request. In embodiments, the request identifier may be created when a data is collected and analyzed for a particular business transaction.

Each of application servers 2940, 2950 and 2960 may include an application and agents. Each application may run on the corresponding application server. Each of applications 2942, 2952 and 2962 on application servers 2940-2960 may operate similarly to application 2932 and perform at least a portion of a distributed business transaction. Agents 2944, 2954 and 2964 may monitor applications 2942-2962, collect and process data at runtime, and communicate with controller 2990. The applications 2932, 2942, 2952 and 2962 may communicate with each other as part of performing a distributed transaction. In particular, each application may call any application or method of another virtual machine.

Asynchronous network machine 2970 may engage in asynchronous communications with one or more application servers, such as application server 2950 and 2960. For example, application server 2950 may transmit several calls or messages to an asynchronous network machine. Rather than communicate back to application server 2950, the asynchronous network machine may process the messages and eventually provide a response, such as a processed message, to application server 2960. Because there is no return message from the asynchronous network machine to application server 2950, the communications between them are asynchronous.

Data stores 2980 and 2985 may each be accessed by application servers such as application server 2950. Data store 2985 may also be accessed by application server 2950. Each of data stores 2980 and 2985 may store data, process data, and return queries received from an application server. Each of data stores 2980 and 2985 may or may not include an agent.

Controller 2990 may control and manage monitoring of business transactions distributed over application servers 2930-2960. In some embodiments, controller 2990 may receive application data, including data associated with monitoring client requests at client 2905 and mobile device 2915, from data collection server 2960. In some embodiments, controller 2990 may receive application monitoring data and network data from each of agents 2912, 2919, 2934, 2944 and 2954. Controller 2990 may associate portions of business transaction data, communicate with agents to configure collection of data, and provide performance data and reporting through an interface. The interface may be viewed as a web-based interface viewable by client device 2992, which may be a mobile device, client device, or any other platform for viewing an interface provided by controller 2990. In some embodiments, a client device 2992 may directly communicate with controller 2990 to view an interface for monitoring data.

Client device 2992 may include any computing device, including a mobile device or a client computer such as a desktop, work station or other computing device. Client computer 2992 may communicate with controller 2990 to create and view a custom interface. In some embodiments, controller 2990 provides an interface for creating and viewing the custom interface as a content page, e.g., a web page, which may be provided to and rendered through a network browser application on client device 2992.

Applications 2932, 2942, 2952 and 2962 may be any of several types of applications. Examples of applications that may implement applications 2932-2962 include a Java, PHP, .Net, Node.JS, and other applications.

Figure 30:
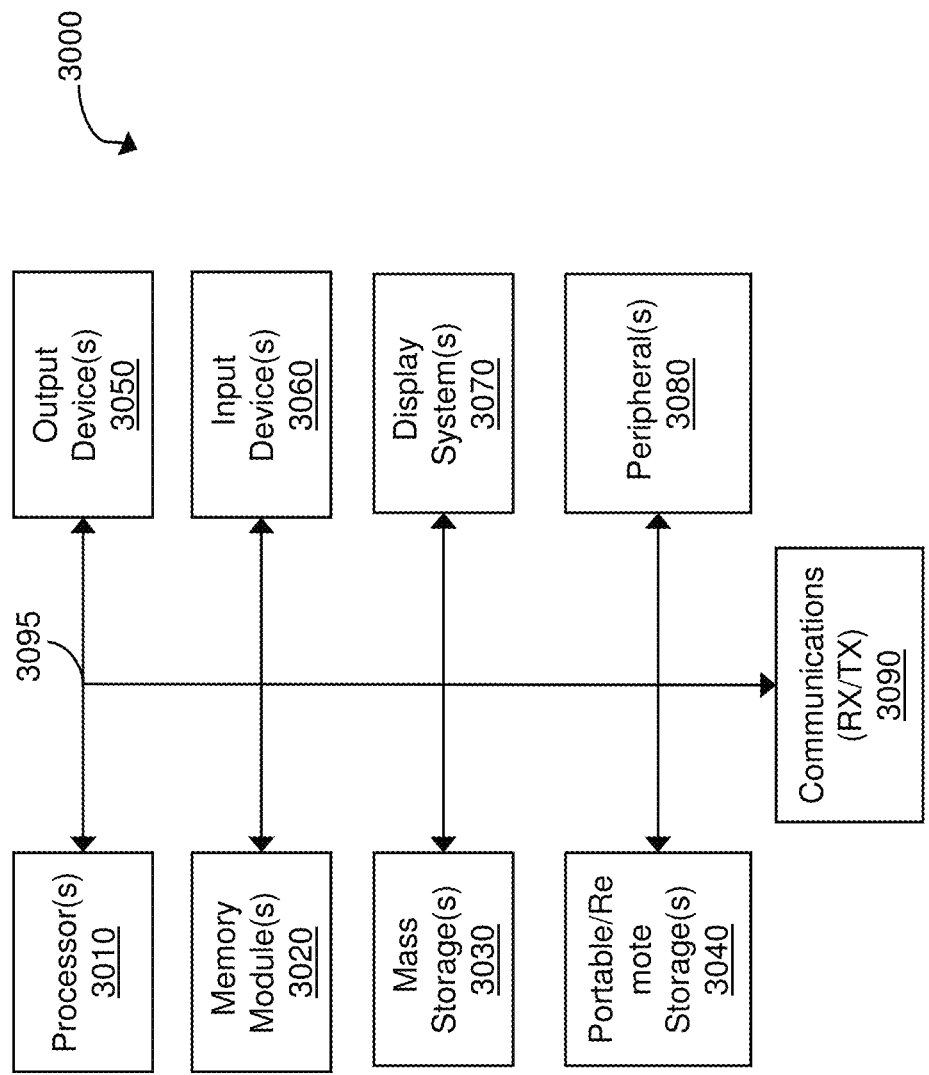
FIG. 30 is a block diagram of an exemplary computing system implementing the disclosed technology.

FIG. 30 is a block diagram of a computer system 3000 for implementing the present technology. System 3000 of FIG. 30 may be implemented in the contexts of the likes of clients 2905, 2992, network server 2925, servers 2930, 2940, 2950, 2960, a synchronous network machine 2970 and controller 2990.

The computing system 3000 of FIG. 30 includes one or more processors 3010 and memory 3020. Main memory 3020 stores, in part, instructions and data for execution by processor 3010. Main memory 3010 can store the executable code when in operation. The system 3000 of FIG. 30 further includes a mass storage device 3030, portable storage medium drive(s) 3040, output devices 3050, user input devices 3060, a graphics display 3070, and peripheral devices 3080.

The components shown in FIG. 30 are depicted as being connected via a single bus 3090. However, the components may be connected through one or more data transport means. For example, processor unit 3010 and main memory 3020 may be connected via a local microprocessor bus, and the mass storage device 3030, peripheral device(s) 3080, portable or remote storage device 3040, and display system 3070 may be connected via one or more input/output (I/O) buses.

Mass storage device 3030, which may be implemented with a magnetic disk drive or an optical disk drive, is a non-volatile storage device for storing data and instructions for use by processor unit 3010. Mass storage device 3030 can store the system software for implementing embodiments of the present invention for purposes of loading that software into main memory 620.

Portable storage device 3040 operates in conjunction with a portable non-volatile storage medium, such as a compact disk, digital video disk, magnetic disk, flash storage, etc. to input and output data and code to and from the computer system 3000 of FIG. 30. The system software for implementing embodiments of the present invention may be stored on such a portable medium and input to the computer system 3000 via the portable storage device 3040.

Input devices 3060 provide a portion of a user interface. Input devices 3060 may include an alpha-numeric keypad, such as a keyboard, for inputting alpha-numeric and other information, or a pointing device, such as a mouse, a trackball, stylus, or cursor direction keys. Additionally, the system 3000 as shown in FIG. 30 includes output devices 3050. Examples of suitable output devices include speakers, printers, network interfaces, and monitors.

Display system 3070 may include a liquid crystal display (LCD) or other suitable display device. Display system 3070 receives textual and graphical information, and processes the information for output to the display device.

Peripherals 3080 may include any type of computer support device to add additional functionality to the computer system. For example, peripheral device(s) 3080 may include a modem or a router.

The components contained in the computer system 3000 of FIG. 30 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 3000 of FIG. 30 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for identifying a root cause of a performance issue in a monitored entity, including:
   a processor;
   a memory; and
   one or more modules stored in the memory and executable by a processor to perform operations including:
      detect a performance issue with the monitored entity in a monitored environment of networked entities;
      receive a plurality of different datatypes and associated data for each entity of the networked entities, wherein the plurality of datatypes include metrics, events, logs, snapshots, and configurations;
      provide a dashboard user interface to display the different datatypes and associated data for each entity as user selectable items;
      receive user input through the dashboard user interface that indicate a selection of at least two datatypes of the plurality of received datatypes for performing correlation analysis;
      perform the correlation analysis using the received user selection of the at least two datatypes, wherein the correlation analysis identifies words or phrases using a logs based analysis of log messages associated with the at least two datatypes;
      identify a candidate root cause of the performance issue based on the correlation analysis using the identified words or phrases from the logs based analysis; and
      display the identified candidate root cause through the dashboard user interface.

2. The system of claim 1, wherein:
   the monitored entity includes a business transaction;
   the user input indicative of the selection of the two of the datatypes include a selection of events and metrics; and
   the selection of metrics including a selection one of a plurality of metrics time-series for each entity.

3. The system of claim 2, wherein the one or more modules are executable by a processor to perform operations including:
   assign an anomaly score for each data point in the selected one of the plurality of metrics time-series for each entity;

determine a correlation between the assigned anomaly score and the events to perform the correlation; and identify one or more of the events as the candidate root cause based on the correlation between the assigned anomaly score and the events.

4. The system of claim 1, wherein:

the user input indicative of the selection of the two of the datatypes include a selection of logs and metrics; and the selection of metrics including a selection one of a plurality of metrics time-series for each entity.

5. The system of claim 4, wherein the one or more modules are executable by a processor to perform operations including:

assign an anomaly score for each data point in the selected one of the plurality of metrics time-series for each entity;

determine a correlation between the assigned anomaly score and words or phrases in the logs to perform the correlation; and identify one or more of the words or phrases in the logs as the candidate root cause based on the correlation between the assigned anomaly score and the words or phrases in the logs.

6. The system of claim 1, wherein:

the user input indicative of the selection of the two of the datatypes include a selection of configurations and metrics; and the selection of metrics including a selection one of a plurality of metrics time-series for each entity.

7. The system of claim 6, wherein the one or more modules are executable by a processor to perform operations including:

assign an anomaly score for each data point in the selected one of the plurality of metrics time-series for each entity;

determine a correlation between the assigned anomaly score and the configurations to perform the correlation; and identify one or more of the configurations as the candidate root cause based on the correlation between the assigned anomaly score and the configurations.

8. A method for identifying a root cause of a performance issue in a monitored business transaction, including:

detecting a performance issue with the business transaction running in a monitored environment of networked entities;

receiving a plurality of different datatypes and associated data for each entity of the networked entities, wherein the plurality of datatypes include metrics, events, logs, snapshots, and configurations;

providing a dashboard user interface to display the different datatypes and associated data for each entity as user selectable items;

receiving user input through the dashboard user interface that indicate a selection of at least two datatypes of the plurality of received datatypes for performing correlation analysis;

performing the correlation analysis using the received user selection of the at least two datatypes, wherein the correlation analysis identifies words or phrases using a logs based analysis of log messages associated with the at least two datatypes;

identifying a candidate root cause of the performance issue based on the correlation analysis using the identified words or phrases from the logs based analysis; and displaying the identified candidate root cause through the dashboard user interface.

9. The method of claim 8, wherein:

the monitored entity includes a business transaction;

the user input indicative of the selection of the two of the datatypes include a selection of events and metrics; and the selection of metrics including a selection one of a plurality of metrics time-series for each entity.

10. The method of claim 9, including:

assigning an anomaly score for each data point in the selected one of the plurality of metrics time-series for each entity;

determining a correlation between the assigned anomaly score and the events to perform the correlation; and identifying one or more of the events as the candidate root cause based on the correlation between the assigned anomaly score and the events.

11. The method of claim 8, wherein:

the user input indicative of the selection of the two of the datatypes include a selection of logs and metrics; and the selection of metrics including a selection one of a plurality of metrics time-series for each entity.

12. The method of claim 11, including:

assigning an anomaly score for each data point in the selected one of the plurality of metrics time-series for each entity;

determining a correlation between the assigned anomaly score and words or phrases in the logs to perform the correlation; and identifying one or more of the words or phrases in the logs as the candidate root cause based on the correlation between the assigned anomaly score and the words or phrases in the logs.

13. The method of claim 8, wherein:

the user input indicative of the selection of the two of the datatypes include a selection of configurations and metrics; and the selection of metrics including a selection one of a plurality of metrics time-series for each entity.

14. The method of claim 13, including:

assigning an anomaly score for each data point in the selected one of the plurality of metrics time-series for each entity;

determining a correlation between the assigned anomaly score and the configurations to perform the correlation; and identifying one or more of the configurations as the candidate root cause based on the correlation between the assigned anomaly score and the configurations.

15. A non-transitory computer readable medium embodying instructions when executed by a processor to cause operations to be performed including:

detecting a performance issue with the business transaction running in a monitored environment of networked entities;

receiving a plurality of different datatypes and associated data for each entity of the networked entities, wherein the plurality of datatypes include metrics, events, logs, snapshots, and configurations;

providing a dashboard user interface to display the different datatypes and associated data for each entity as user selectable items;

receiving user input through the dashboard user interface that indicate a selection at least two of the datatypes of the plurality of received datatypes for performing correlation analysis for performing correlation analysis;

performing the correlation analysis using the received user selection of the at least two datatypes, wherein the correlation analysis identifies words or phrases using a logs based analysis of log messages associated with the at least two datatypes;

identifying a candidate root cause of the performance issue based on the correlation analysis using the identified words or phrases from the logs based analysis; and displaying the identified candidate root cause through the dashboard user interface.

16. The non-transitory computer readable medium claim 15, wherein: the monitored entity includes a business transaction;

the user input indicative of the selection of the two of the datatypes include a selection of events and metrics; and the selection of metrics including a selection one of a plurality of metrics time-series for each entity.

17. The non-transitory computer readable medium of claim 16, wherein the operations include:

assigning an anomaly score for each data point in the selected one of the plurality of metrics time-series for each entity;

determining a correlation between the assigned anomaly score and the events to perform the correlation; and identifying one or more of the events as the candidate root cause based on the correlation between the assigned anomaly score and the events.

18. The non-transitory computer readable medium of claim 15, wherein:

the user input indicative of the selection of the two of the datatypes include a selection of logs and metrics; and the selection of metrics including a selection one of a plurality of metrics time-series for each entity.

19. The non-transitory computer readable medium of claim 18, wherein the operations include:

assigning an anomaly score for each data point in the selected one of the plurality of metrics time-series for each entity;

determining a correlation between the assigned anomaly score and words or phrases in the logs to perform the correlation; and identifying one or more of the words or phrases in the logs as the candidate root cause based on the correlation between the assigned anomaly score and the words or phrases in the logs.

20. The non-transitory computer readable medium of claim 15, wherein the operations include:

the user input indicative of the selection of the two of the datatypes include a selection of configurations and metrics; and the selection of metrics including a selection one of a plurality of metrics time-series for each entity.

21. The non-transitory computer readable medium of claim 20, wherein the operations include:

assigning an anomaly score for each data point in the selected one of the plurality of metrics time-series for each entity;

determining a correlation between the assigned anomaly score and the configurations to perform the correlation; and identifying one or more of the configurations as the candidate root cause based on the correlation between the assigned anomaly score and the configurations.

* * * * *